US012412696B2

(12) United States Patent
Yamauchi et al.

(10) Patent No.: US 12,412,696 B2
(45) Date of Patent: Sep. 9, 2025

(54) INDUCTOR COMPONENT AND MOUNTING COMPONENT

(71) Applicant: Murata Manufacturing Co., Ltd., Kyoto-fu (JP)

(72) Inventors: Kouji Yamauchi, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 575 days.

(21) Appl. No.: 18/052,467

(22) Filed: Nov. 3, 2022

(65) Prior Publication Data

US 2023/0140067 A1 May 4, 2023

(30) Foreign Application Priority Data

Nov. 4, 2021 (JP) ................................ 2021-180474

(51) Int. Cl.
*H01F 27/29* (2006.01)
*H01F 27/255* (2006.01)

(52) U.S. Cl.
CPC .......... *H01F 27/29* (2013.01); *H01F 27/255* (2013.01)

(58) Field of Classification Search
CPC .... H01F 27/29; H01F 27/255; H01F 17/0006; H01F 41/046; H01F 17/04; H01F 2017/048; H01F 27/292; H01F 17/00
USPC .................................. 336/83, 192, 200, 232
See application file for complete search history.

(56) References Cited

U.S. PATENT DOCUMENTS

| | | | | |
|---|---|---|---|---|
| 2011/0025442 A1* | 2/2011 | Hsieh | H01F 17/0013 336/200 |
| 2012/0112869 A1* | 5/2012 | Nishikawa | H01F 17/0013 336/200 |
| 2012/0133472 A1* | 5/2012 | Nishikawa | H01F 17/04 336/200 |

FOREIGN PATENT DOCUMENTS

JP 2014-013815 A 1/2014

* cited by examiner

*Primary Examiner* — Tuyen T Nguyen
(74) *Attorney, Agent, or Firm* — Studebaker Brackett PLLC

(57) ABSTRACT

An inductor component includes an element body having a main surface, a coil disposed in the element body, and extending along the main surface, and a first vertical wiring and a second vertical wiring provided in the element body such that respective end surfaces thereof are exposed from the main surface of the element body, and connected to respective ends of the coil. The coil has a coil wiring portion having a first end portion and a second end portion, and extending along a circumferential direction, with the number of turns equal to or less than 1, a first pad portion that is a portion to which the first vertical wiring is connected and that is connected to the first end portion, and a second pad portion that is a portion to which the second vertical wiring is connected and that is connected to the second end portion.

20 Claims, 16 Drawing Sheets

INDUCTOR COMPONENT AND MOUNTING COMPONENT

CROSS-REFERENCE TO RELATED APPLICATION

This application claims benefit of priority to Japanese Patent Application No. 2021-180474, filed Nov. 4, 2021, the entire content of which is incorporated herein by reference.

BACKGROUND

Technical Field

The present disclosure relates to an inductor component and a mounting component.

Background Art

There has been an inductor component described in Japanese Unexamined Patent Application Publication No. 2014-13815. The inductor component includes a substrate, spiral conductors provided on both surfaces of the substrate, respectively, a magnetic layer covering the spiral conductor, an outer electrode provided on a surface of the magnetic layer, an extended conductor connected to an outer peripheral end of the spiral conductor, and a connection conductor connecting the extended conductor and the outer electrode. The spiral conductor and the extended conductor constitute a coil. The extended conductor is disposed outside in a radial direction of the spiral conductor, and extends along a side of the substrate.

SUMMARY

Incidentally, in the above-described existing inductor component, when a DC superposition allowable current is increased in order to cause a large current to flow, the number of turns of the spiral conductor is made to be equal to or less than 1 in order to suppress magnetic saturation. It has been found that there are the following problems when actually trying to manufacture such an inductor component.

Since both ends of the spiral conductor come close to each other, the two extended conductors respectively connected to both the ends of the spiral conductor also come close to each other, and there is a possibility that the two extended conductors having a greatest potential difference in the coil will be short-circuited. In addition, since the two extended conductors are disposed outside in the radial direction of the spiral conductor, there is a possibility that the inductor component will become large.

Accordingly, the present disclosure provides an inductor component and a mounting component capable of reducing a possibility of a short circuit of a coil and of reducing the size of the inductor component.

An inductor component as an aspect of the present disclosure includes an element body having a main surface, a coil disposed in the element body, and extending along the main surface, and a first vertical wiring and a second vertical wiring provided in the element body such that respective end surfaces thereof are exposed from the main surface of the element body, and connected to respective ends of the coil. The coil has a coil wiring portion having a first end portion and a second end portion, and extending along a circumferential direction, with the number of turns equal to or less than 1, a first pad portion that is a portion to which the first vertical wiring is connected and that is connected to the first end portion, and a second pad portion that is a portion to which the second vertical wiring is connected and that is connected to the second end portion. At least a part of the first pad portion extends in a direction that intersects a direction in which the first end portion and the second end portion are connected and that is a direction in which an inner peripheral surface of the coil wiring portion is approached when viewed from a direction orthogonal to the main surface. At least a part of the second pad portion extends in the direction that intersects the direction in which the first end portion and the second end portion are connected and that is the direction in which the inner peripheral surface of the coil wiring portion is approached when viewed from the direction orthogonal to the main surface.

Here, the fact that the number of turns of the coil wiring portion is less than 1 refers to a state in which the coil wiring portion does not have parts that are adjacent to each other in a radial direction of the coil and run side by side in a winding direction (that is, parts that are adjacent and overlap in the radial direction) when viewed from the direction orthogonal to the main surface. A fact that the number of turns of the coil wiring portion is equal to or greater than 1 refers to a state in which the coil wiring portion has parts that are adjacent to each other in the radial direction of the coil and run side by side in the winding direction when viewed from the direction orthogonal to the main surface. That is, a fact that the number of turns of the coil wiring portion is equal to or less than 1 refers to a state in which the above-described parts running side by side are not present, or both end surfaces of the coil wiring portion are tangent to the same plane along the radial direction of the coil when viewed from an axial direction of the coil.

Further, a direction in which the first end portion and the second end portion are connected when viewed from the direction orthogonal to the main surface is a direction in which a center in a width direction of an end edge of the first end portion and a center in a width direction of an end edge of the second end portion are connected when viewed from the direction orthogonal to the main surface.

According to the above-described aspect, the first pad portion extends in the direction that intersects the direction in which the first end portion and the second end portion are connected and that is a direction in which the inner peripheral surface of the coil wiring portion is approached, and the second pad portion extends in the direction that intersects the direction in which the first end portion and the second end portion are connected and that is a direction in which the inner peripheral surface of the coil wiring portion is approached. According to this, it is possible to prevent the first pad portion and the second pad portion from approaching each other, and to reduce a possibility of a short circuit between the first pad portion and the second pad portion having a greatest potential difference in the coil. In addition, it is possible to prevent the first pad portion and the second pad portion from extending outward in the radial direction of the coil, to reduce the inductor component in size.

Preferably, in an embodiment of the inductor component, the element body includes a magnetic powder and a resin containing the magnetic powder.

According to the above-described embodiment, inductance can be increased.

Preferably, an embodiment of the inductor component further includes a first external terminal in contact with the main surface and the end surface of the first vertical wiring, and a second external terminal in contact with the main surface and the end surface of the second vertical wiring.

According to the above-described embodiment, since the first external terminal spreads across the main surface and the first vertical wiring, and the second external terminal spreads across the main surface and the second vertical wiring, sizes of the respective first and second external terminals can be controlled, and design of the first and second external terminals can be selected from a viewpoint of mounting properties and mechanical strength.

Preferably, in an embodiment of the inductor component, the element body includes a magnetic powder, and the first external terminal and the second external terminal are in contact with the magnetic powder.

According to the above-described embodiment, adhesion strength between each of the first external terminal and the second external terminal, and the element body is improved.

Preferably, an embodiment of the inductor component further includes a coating film provided on the main surface, and the coating film includes a black colorant.

According to the above-described embodiment, by providing the coating film on the main surface, when a plurality of the external terminals is provided on the main surface, insulation between the external terminals can be reliably ensured. In addition, since the coating film is black, it is possible to hide scratches on a surface of the element body, thereby improving a rate of good appearance.

Preferably, in an embodiment of the inductor component, when viewed from the direction orthogonal to the main surface, the first pad portion has a linear first plane that is a distal end surface in an extending direction of the first pad portion and that faces the inner peripheral surface of the coil wiring portion, and a shortest distance between the first plane and the inner peripheral surface of the coil wiring portion is not a minimum among distances between an outer surface of the first pad portion and the inner peripheral surface of the coil wiring portion.

Here, the distance between the outer surface of the first pad portion and the inner peripheral surface of the coil wiring portion refers to a shortest distance among distances between respective surfaces constituting the outer surface of the first pad portion and the inner peripheral surface of the coil wiring portion.

According to the above-described embodiment, it is possible to reduce a possibility of a short circuit between the first plane of the first pad portion and the inner peripheral surface of the coil wiring portion.

Preferably, in an embodiment of the inductor component, when viewed from the direction orthogonal to the main surface, the first pad portion has a linear first plane extending in the direction in which the first end portion and the second end portion are connected, and facing the inner peripheral surface of the coil wiring portion, and a linear second plane extending in a direction orthogonal to the direction in which the first end portion and the second end portion are connected, and facing the inner peripheral surface of the coil wiring portion. When a surface parallel to the first plane and tangent to a part, of the inner peripheral surface of the coil wiring portion, facing the first plane is defined as a first virtual surface, and a surface parallel to the second plane and tangent to a part, of the inner peripheral surface of the coil wiring portion, facing the second plane is defined as a second virtual surface, a first distance a between the second virtual surface and the second plane is less than a second distance b between the first virtual surface and the first plane.

According to the above-described embodiment, since the first distance a is less than the second distance b, it is possible to reduce a possibility of a short circuit between the first plane of the first pad portion and a part, of the inner peripheral surface of the coil wiring portion, facing the first plane. Even if a short circuit occurs between the second virtual surface and the second plane, a variation in a coil length is suppressed as compared to a case where a short circuit occurs between the first virtual surface and the first plane, and thus influence of a layer short can be suppressed.

Preferably, in an embodiment of the inductor component, when viewed from the direction orthogonal to the main surface, the first pad portion has a linear first plane extending in the direction in which the first end portion and the second end portion are connected, and facing the inner peripheral surface of the coil wiring portion, and a linear second plane extending in a direction orthogonal to the direction in which the first end portion and the second end portion are connected, and facing the inner peripheral surface of the coil wiring portion. When a surface parallel to the first plane and tangent to a part, of the inner peripheral surface of the coil wiring portion, facing the first plane is defined as a first virtual surface, and a surface parallel to the second plane and tangent to a part, of the inner peripheral surface of the coil wiring portion, facing the second plane is defined as a second virtual surface, a first distance a between the second virtual surface and the second plane is equal to or greater than a second distance b between the first virtual surface and the first plane.

According to the above-described embodiment, since the first distance a is equal to or greater than the second distance b, the first pad portion can be increased in the extending direction thereof. Thus, a size of the first pad portion can be increased, and connection reliability between the first pad portion and the first vertical wiring can be improved.

Preferably, in an embodiment of the inductor component, the element body includes a magnetic powder, and the first distance a between the second virtual surface and the second plane is equal to or greater than twice a particle size D50 of the magnetic powder.

According to the above-described embodiment, by increasing the distance between the second virtual surface and the second plane to be greater than the magnetic powder, it is possible to further reduce a possibility of a short circuit between the second virtual surface and the second plane.

Preferably, in an embodiment of the inductor component, when viewed from the direction orthogonal to the main surface, a shortest distance c between the first pad portion and the second pad portion is greater than the first distance a between the second virtual surface and the second plane.

According to the above-described embodiment, it is possible to further reduce a possibility of a short circuit between the first pad portion and the second pad portion that have a greatest potential difference in the coil. Even if a short circuit occurs between the second virtual surface and the second plane, a variation in the coil length is suppressed as compared to a case where a short circuit occurs between the first pad portion and the second pad portion, and thus influence of a layer short can be suppressed.

Preferably, in an embodiment of the inductor component, when viewed from the direction orthogonal to the main surface, a shortest distance c between the first pad portion and the second pad portion is equal to or less than the first distance a between the second virtual surface and the second plane.

According to the above-described embodiment, since the first pad portion and the second pad portion can be brought close to each other, a length of the coil wiring portion can be increased. Thus, the coil length can be increased, and the inductance can be increased.

Preferably, in an embodiment of the inductor component, the element body includes a magnetic powder, and the shortest distance c between the first pad portion and the second pad portion is equal to or greater than twice a particle size D50 of the magnetic powder.

According to the above-described embodiment, by increasing the distance between the first pad portion and the second pad portion to be greater than the magnetic powder, it is possible to further reduce a possibility of a short circuit between the first pad portion and the second pad portion.

Preferably, in an embodiment of the inductor component, the first pad portion has a first portion extending from the first end portion in the direction in which the first end portion and the second end portion are connected when viewed from the direction orthogonal to the main surface, and a second portion extending from a side of the first portion in the direction that intersects the direction in which the first end portion and the second end portion are connected and that is the direction in which the inner peripheral surface of the coil wiring portion is approached. The second pad portion has a first portion extending from the second end portion in the direction in which the first end portion and the second end portion are connected when viewed from the direction orthogonal to the main surface, and a second portion extending from a side of the first portion in the direction that intersects the direction in which the first end portion and the second end portion are connected and that is the direction in which the inner peripheral surface of the coil wiring portion is approached.

According to the above-described embodiment, an area of the first pad portion can be increased, and the connection reliability between the first pad portion and the first vertical wiring can be improved. An area of the second pad portion can be increased, and connection reliability between the second pad portion and the second vertical wiring can be improved.

Preferably, in an embodiment of the inductor component, when viewed from the direction orthogonal to the main surface, the first portion of the first pad portion does not protrude inward from the inner peripheral surface of the coil wiring portion.

According to the above-described embodiment, it is possible to increase a distance between the inner peripheral surface of the coil wiring portion and the first pad portion in the direction in which the first end portion and the second end portion are connected, and to reduce a possibility of a short circuit between the coil wiring portion and the first pad portion in the direction in which the first end portion and the second end portion are connected.

Preferably, in an embodiment of the inductor component, a thickness of the coil is less than a thickness of each of the first vertical wiring and the second vertical wiring.

According to the above-described embodiment, volume of the element body can be increased, and the inductance can be increased.

Preferably, an embodiment of the inductor component further includes a nonmagnetic insulating layer configured to cover at least a part of the coil.

According to the above-described embodiment, insulation properties of the coil can be improved.

Preferably, in an embodiment of the inductor component, the element body has a first magnetic layer and a second magnetic layer stacked in order in a first direction orthogonal to the main surface. The first vertical wiring and the second vertical wiring extend in the first direction from the respective ends of the coil. The first magnetic layer is present in a direction opposite to the first direction of the coil. The second magnetic layer is present in the first direction of the coil and in a direction orthogonal to the first direction, and the first vertical wiring and the second vertical wiring penetrate the second magnetic layer. A thickness of the first magnetic layer is greater than a thickness of the second magnetic layer.

According to the above-described embodiment, since there is a limit in a thickness related to a process such as a resist thickness for each of the first vertical wiring and the second vertical wiring, there is a limit in the thickness of the second magnetic layer. On the other hand, the inductance can be increased by increasing the thickness of the first magnetic layer.

Preferably, an embodiment of a mounting component includes a substrate, and the inductor component according to the embodiment disposed in the substrate.

According to the above-described embodiment, since the inductor component is built into the substrate, it is possible to increase a mounting area of a surface of the substrate.

According to the inductor component and the mounting component as an aspect of the present disclosure, it is possible to reduce a possibility of a short circuit of a coil, and to reduce the size of the inductor component.

DETAILED DESCRIPTION

Hereinafter, an inductor component and a mounting component as an aspect of the present disclosure will be described in detail by using embodiments illustrated in the figures. Note that, some of the figures are schematic, and do not reflect actual dimensions and ratios in some cases.

First Embodiment

Configuration

Figure 1:
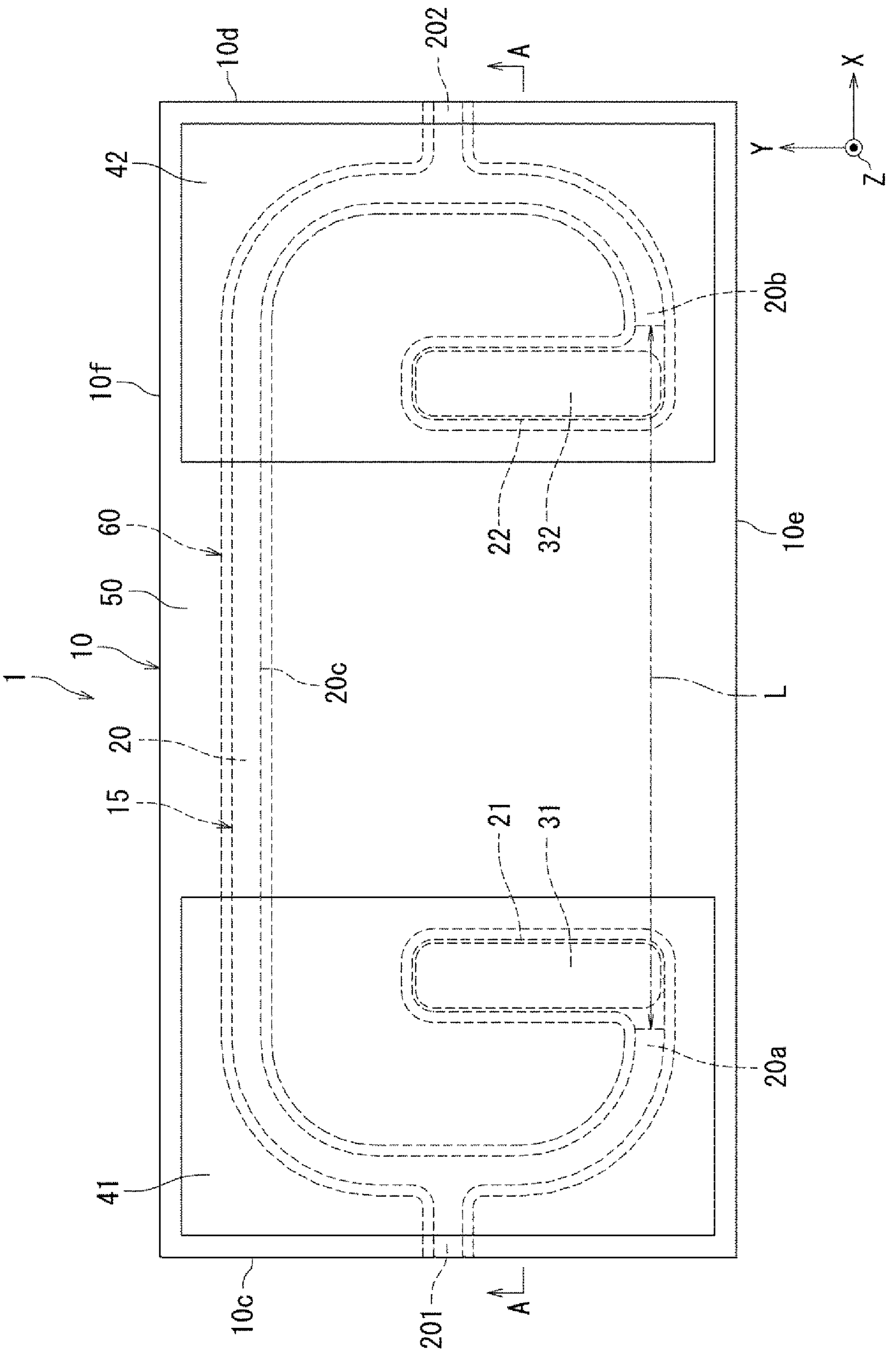
FIG. 1 is a plan view illustrating a first embodiment of an inductor component.
Figure 2:
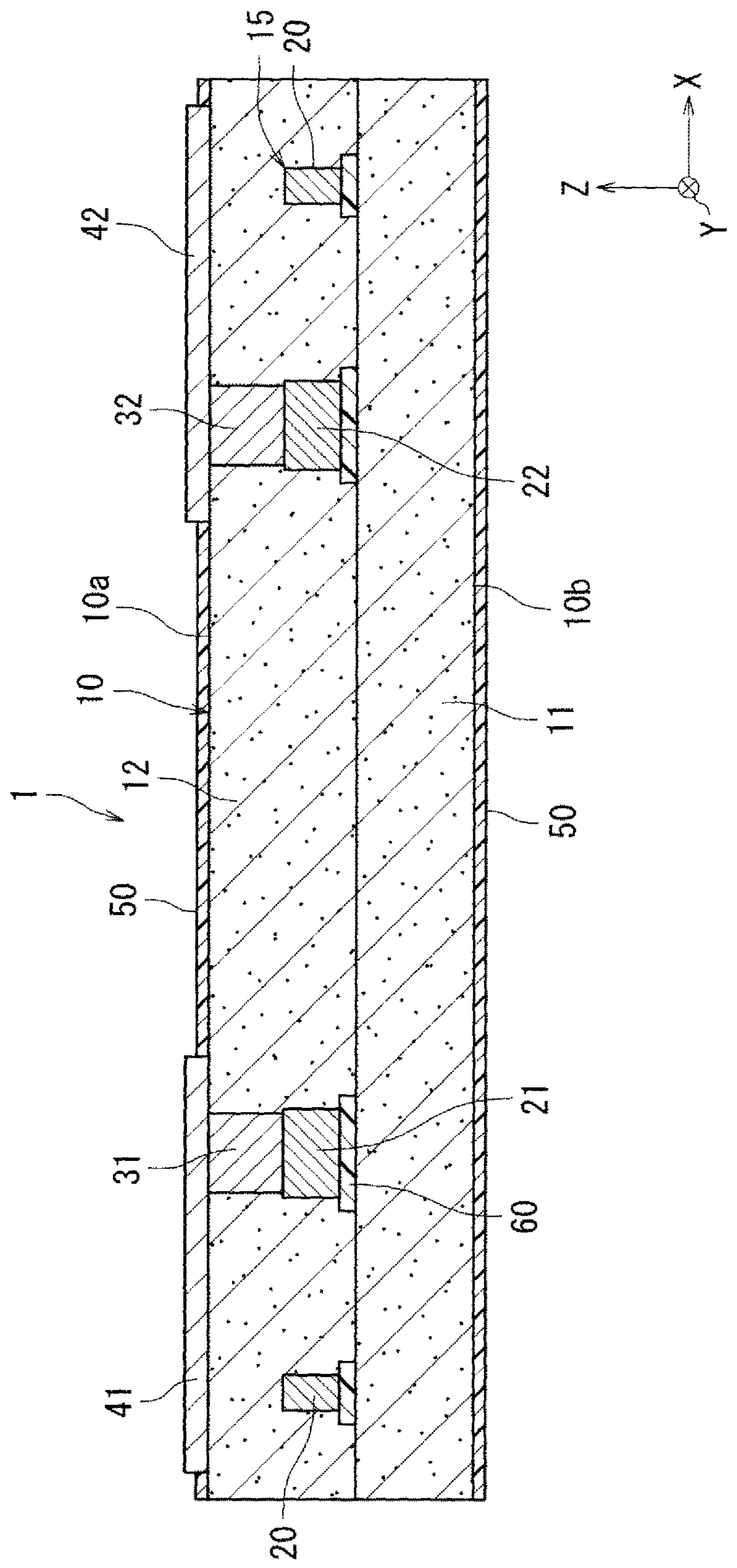
FIG. 2 is a sectional view taken along a line A-A in FIG. 1.

FIG. 1 is a plan view illustrating a first embodiment of an inductor component. FIG. 2 is a sectional view taken along the line A-A in FIG. 1.

An inductor component 1 is mounted, for example, in electronic devices such as personal computers, DVD players, digital cameras, TVs, mobile phones, and car electronics, and is, for example, a component having a rectangular parallelepiped shape as a whole. However, the shape of the inductor component 1 is not particularly limited, and may be a cylindrical shape, a polygonal columnar shape, a truncated cone shape, or a truncated polygonal cone shape.

As illustrated in FIG. 1 and FIG. 2, the inductor component 1 includes an element body 10, a coil 15 disposed in the element body 10, a nonmagnetic insulating layer 60 covering at least a part of the coil 15, a first columnar wiring 31 and a second columnar wiring 32 provided in the element body 10 with respective end surfaces exposed from a first main surface 10*a* of the element body 10 and connected to respective ends of the coil 15, a first external terminal 41 exposed from the first main surface 10*a* of the element body 10 and connected to the first columnar wiring 31, a second external terminal 42 exposed from the first main surface 10*a* of the element body 10 and connected to the second columnar wiring 32, and a coating film 50 provided on each of the first main surface 10*a* and a second main surface 10*b* of the element body 10.

In the figure, a thickness direction of the inductor component 1 is defined as a Z direction, a forward Z direction is referred to as an upper side, and a reverse Z direction is referred to as a lower side. In a plane orthogonal to the Z direction of the inductor component 1, a length direction that is a longer direction of the inductor component 1 and is a direction in which the first external terminal 41 and the second external terminal 42 are arranged is defined as an X direction, and a width direction of the inductor component 1 that is a direction orthogonal to the length direction is defined as a Y direction.

The element body 10 has the first main surface 10*a* and the second main surface 10*b*, and a first side surface 10*c*, a second side surface 10*d*, a third side surface 10*e*, and a fourth side surface 10*f* that are located between the first main surface 10*a* and the second main surface 10*b* and that connect the first main surface 10*a* and the second main surface 10*b*.

The first main surface 10*a* and the second main surface 10*b* are disposed on sides opposite to each other in the Z direction, respectively, the first main surface 10*a* is disposed in the forward Z direction, and the second main surface 10*b* is disposed in the reverse Z direction. The first side surface 10*c* and the second side surface 10*d* are disposed on sides opposite to each other in the X direction, respectively, the first side surface 10*c* is disposed in a reverse X direction, and the second side surface 10*d* is disposed in a forward X direction. The third side surface 10*e* and the fourth side surface 10*f* are disposed on sides opposite to each other in the Y direction, respectively, the third side surface 10*e* is disposed in a reverse Y direction, and the fourth side surface 10*f* is disposed in a forward Y direction.

The element body 10 has a first magnetic layer 11 and a second magnetic layer 12 stacked in order along the forward Z direction. The term "in order" merely indicates a positional relationship between the first magnetic layer 11 and the second magnetic layer 12, and has no relation to an order of formation of the first magnetic layer 11 and the second magnetic layer 12. The forward Z direction is an example of a "first direction orthogonal to a main surface" described in the claims.

Each of the first magnetic layer 11 and the second magnetic layer 12 includes a magnetic powder and a resin containing the magnetic powder. Inductance can be increased by the magnetic powder. The resin is, for example, epoxy-based, phenol-based, liquid crystal polymer-based, polyimide-based, or acrylic-based, or an organic insulating material made of a mixture thereof. The magnetic powder is, for example, a FeSi-based alloy such as FeSiCr, a FeCo-based alloy, a Fe-based alloy such as NiFe, or an amorphous alloy thereof. Accordingly, in comparison with a magnetic layer made of ferrite, since it is possible to improve DC superposition characteristics by the magnetic powder, and the magnetic powders are insulated from each other by the resin, a loss (iron loss) at a high frequency is reduced. Note that, the magnetic layer may be ferrite or a sintered body of magnetic powder, that contains no organic resin.

The coil 15 extends along the first main surface 10*a* between the first magnetic layer 11 and the second magnetic layer 12. Specifically, the first magnetic layer 11 is present in the reverse Z direction of the coil 15, and the second magnetic layer 12 is present in the forward Z direction of the coil 15 and in a direction orthogonal to the forward Z direction.

The coil 15 has a coil wiring portion 20, a first pad portion 21, and a second pad portion 22. The coil wiring portion 20 has a first end portion 20*a* and a second end portion 20*b*. The first pad portion 21 is connected to the first end portion 20*a*. The second pad portion 22 is connected to the second end portion 20*b*.

The coil wiring portion 20 extends along a circumferential direction with the number of turns equal to or less than 1. As described above, since the number of turns of the coil wiring portion 20 is equal to or less than 1, it is possible to suppress magnetic saturation, to increase a DC superposition allowable current, and to cause a large current to flow. The number of turns of the coil wiring portion 20 is preferably equal to or greater than 0.5. The coil wiring portion 20 is disposed so as to be symmetrical with respect to a center line in the X direction of the element body 10. The first end portion 20*a* is disposed on a side of the first side surface 10*c* and a side of the third side surface 10*e* of the element body 10, and the second end portion 20*b* is disposed on a side of the second side surface 10*d* and a side of the third side surface 10*e* of the element body 10. In this embodiment, the coil wiring portion 20 is formed in a substantially C-shape.

The coil wiring portion 20 has the same width along an extending direction. The width is a dimension in a direction orthogonal to the extending direction. The first end portion 20*a* is a portion connected to the first pad portion 21. The second end portion 20*b* is a portion connected to the second pad portion 22. A line width of the coil wiring portion 20 is less than a line width of the first pad portion 21 and a line width of the second pad portion 22. Note that, the line width of the first pad portion 21 and the line width of the second pad portion 22 may be the same as the line width of the coil wiring portion 20.

The first pad portion 21 is a portion to which the first columnar wiring 31 is connected. The first pad portion 21 is a portion overlapping the first columnar wiring 31 when viewed from a direction orthogonal to the first main surface 10*a*, has a shape corresponding to an outer peripheral surface of the first columnar wiring 31, and is slightly greater than the first columnar wiring 31. The first pad portion 21 extends in a direction that intersects a direction L (hereinafter also referred to as a connection direction L) in which the first end portion 20*a* and the second end portion 20*b* are connected and that is a direction in which an inner peripheral surface 20*c* of the coil wiring portion 20 is approached when viewed from the direction orthogonal to the first main surface 10*a*. The connection direction L is a direction in which a center in a width direction of an end edge of the first end portion 20*a* and a center in a width direction of an end edge of the second end portion 20*b* are connected, when viewed from the direction orthogonal to the first main surface 10*a*. The end edge of the first end portion 20*a* and the end edge of the second end portion 20*b* are each indicated by a dotted line in FIG. 1.

In this embodiment, the first pad portion 21 extends in a direction orthogonal to the connection direction L. The connection direction L is parallel to the X direction, and the direction orthogonal to the connection direction L is parallel to the Y direction. That is, the first pad portion 21 is disposed on a side of the first side surface 10*c* of the element body 10, and extends along the first side surface 10*c* of the element body 10. The first pad portion 21 is formed in a linear shape when viewed from the direction orthogonal to the first main surface 10*a*. Note that, the first pad portion 21 may extend in a direction intersecting the connection direction L at an angle other than a right angle.

The width of the first pad portion 21 is greater than the width of the coil wiring portion 20. The width of the first pad portion 21 is the same except for an end portion connected to the first end portion 20*a* of the coil wiring portion 20. A width of the end portion of the first pad portion 21 gradually increases along an extending direction of the first pad portion 21.

The second pad portion 22 is a portion to which the second columnar wiring 32 is connected. The second pad portion 22 is a portion overlapping the second columnar wiring 32 when viewed from the direction orthogonal to the first main surface 10*a*, has a shape corresponding to an outer peripheral surface of the second columnar wiring 32, and is slightly greater than the second columnar wiring 32. The second pad portion 22 extends in a direction that intersects the direction L (hereinafter also referred to as the connection direction L) in which the first end portion 20*a* and the second end portion 20*b* are connected and that is a direction in which the inner peripheral surface 20*c* of the coil wiring portion 20 is approached when viewed from the direction orthogonal to the first main surface 10*a*.

In this embodiment, the second pad portion 22 extends in the direction orthogonal to the connection direction L. That is, the second pad portion 22 is disposed on a side of the second side surface 10*d* of the element body 10, and extends along the second side surface 10*d* of the element body 10. The second pad portion 22 is formed in a linear shape when viewed from the direction orthogonal to the first main surface 10*a*. Note that, the second pad portion 22 may extend in a direction intersecting the connection direction L at an angle other than a right angle.

A width of the second pad portion 22 is the same as the width of the first pad portion 21, and greater than the width of the coil wiring portion 20. The width of the second pad portion 22 is the same except for an end portion connected to the second end portion 20*b* of the coil wiring portion 20. A width of the end portion of the second pad portion 22 gradually increases along an extending direction of the second pad portion 22.

The first pad portion 21 is connected to the first columnar wiring 31, and the second pad portion 22 is connected to the second columnar wiring 32. The first columnar wiring 31 and the second columnar wiring 32 extend respectively from both ends of the coil 15 in the direction orthogonal to the first main surface 10*a*.

Here, in this embodiment, the first pad portion 21 and the second pad portion 22 are not included in a turn of the coil 15. This is because the first and second pad portions 21 and 22 are not portions that affect a wiring length of the coil 15. More specifically, a current flowing through the first pad portion 21 flows through the first columnar wiring 31 as is, and a current flowing through the second pad portion 22 flows through the second columnar wiring 32 as is. In other words, a current flowing through the first pad portion 21 flows along the first columnar wiring 31 in the direction orthogonal to the first main surface 10*a*, rather than flowing along the circumferential direction of the coil wiring portion 20, and a current flowing through the second pad portion 22 flows along the second columnar wiring 32 in the direction orthogonal to the first main surface 10*a*, rather than flowing along the circumferential direction of the coil wiring portion 20.

A thickness of each of the coil wiring portion 20, the first pad portion 21, and the second pad portion 22 is preferably equal to or greater than 40 μm, and equal to or less than 120 μm, for example. As a working example of the coil wiring portion 20, the thickness is 35 μm, and a wiring width is 50 μm.

Each of the coil wiring portion 20, the first pad portion 21, and the second pad portion 22 is made of a conductive material, for example, made of a metal material having low electric resistance such as Cu, Ag, Au, or Al. In the present embodiment, the inductor component 1 includes only one layer of the coil wiring portion 20, and thus a reduction in height of the inductor component 1 can be realized. Note that, the coil wiring portion may have a two-layer configuration of a seed layer and an electrolytic plating layer, and may contain Ti or Ni as the seed layer.

A first extended wiring 201 is connected to a part on a side in the reverse X direction of the coil wiring portion 20, and the first extended wiring 201 is exposed from the first side surface 10*c*. A second extended wiring 202 is connected to a part on a side in the forward X direction of the coil wiring portion 20, and the second extended wiring 202 is exposed from the second side surface 10*d*.

The first extended wiring 201 and the second extended wiring 202 are each a wiring to be connected to a power supply wiring when electrolytic plating is additionally performed after forming a shape of the coil wiring portion 20 in a manufacturing process of the inductor component 1. In an inductor substrate state before the inductor component 1 is made as an individual piece, by using the power supply wiring, electrolytic plating can be easily performed additionally, and a line width of the coil 15 can be adjusted. In addition, by providing the first extended wiring 201 and the second extended wiring 202, it is possible to secure strength in cutting of the element body 10 when the inductor component 1 is made as an individual piece, and to improve yield at the time of manufacturing.

Each of the first columnar wiring 31 and the second columnar wiring 32 extends from the coil 15 in the Z direction, and penetrates an inside of the second magnetic layer 12. The columnar wiring is an example of a "vertical wiring" described in the claims.

The first columnar wiring 31 extends from an upper surface of the first pad portion 21 to the first main surface 10*a* of the element body 10, and an end surface of the first columnar wiring 31 is exposed from the first main surface 10*a* of the element body 10. The second columnar wiring 32 extends from an upper surface of the second pad portion 22 to the first main surface 10*a* of the element body 10, and an end surface of the second columnar wiring 32 is exposed from the first main surface 10*a* of the element body 10.

Thus, the first columnar wiring 31 and the second columnar wiring 32 linearly extend from the coil 15 to the first main surface 10*a* in the direction orthogonal to the first main surface 10*a*. Thus, each of the first external terminal 41 and the second external terminal 42 can be connected to the coil 15 with a shorter distance, and the inductor component 1 can be reduced in resistance, and increased in inductance. The first columnar wiring 31 and the second columnar wiring 32 are made of a conductive material, and for example, made of the same material as that of the coil 15.

When viewed from the direction orthogonal to the first main surface 10*a*, the first columnar wiring 31 has substantially the same size as that of the first pad portion 21, and has a shape corresponding to the first pad portion 21. The second columnar wiring 32 has substantially the same size as that of the second pad portion 22, and has a shape corresponding to the second pad portion 22.

Note that, when an upper surface of the coil 15 is covered with the insulating layer 60, each of the first columnar wiring 31 and the second columnar wiring 32 may be electrically connected to the coil 15 through via wiring that penetrates the insulating layer 60. The via wiring is a conductor having a line width (diameter, sectional area) less than that of the columnar wiring. In this case, a "vertical wiring" described in the claims is configured with the via wiring and the columnar wiring.

At this time, the first pad portion 21 is a portion to which a first vertical wiring (the first columnar wiring 31 and the via wiring) is connected. The first pad portion 21 includes not only the portion connected to the via wiring but also a portion overlapping the first columnar wiring 31 when viewed from the direction orthogonal to the first main surface 10*a*. That is, the first pad portion 21 has a shape corresponding to an outer peripheral surface of the first vertical wiring, when viewed from the direction orthogonal to the first main surface 10*a*, and is slightly greater than the first vertical wiring.

The second pad portion 22 is a portion to which a second vertical wiring (the second columnar wiring 32 and the via wiring) is connected. The second pad portion 22 includes not only the portion connected to the via wiring but also a portion overlapping the second columnar wiring 32 when viewed from the direction orthogonal to the first main surface 10*a*. That is, the second pad portion 22 has a shape corresponding to an outer peripheral surface of the second vertical wiring when viewed from the direction orthogonal to the first main surface 10*a*, and is slightly greater than the second vertical wiring.

Preferably, a thickness of the coil 15 is less than a thickness of each of the first columnar wiring 31 and the second columnar wiring 32. According to this, the volume of the element body 10 can be increased, and the inductance can be increased.

Preferably, a thickness of the first magnetic layer 11 is greater than a thickness of the second magnetic layer 12. According to this, since there is a limit in a thickness related to a process such as a resist thickness for each of the first columnar wiring 31 and the second columnar wiring 32, there is a limit in the thickness of the second magnetic layer 12. On the other hand, inductance can be increased by increasing the thickness of the first magnetic layer 11.

The first external terminal 41 and the second external terminal 42 are provided on the first main surface 10*a* of the element body 10. The first external terminal 41 and the second external terminal 42 are each made of a conductive material, and have a three-layer configuration in which, for example, Cu with low electric resistance and excellent in stress resistance, Ni excellent in corrosion resistance, and Au excellent in wettability and reliability are arranged in this order from an inner side to an outer side.

The first external terminal 41 is in contact with an end surface of the first columnar wiring 31 exposed from the first main surface 10*a* of the element body 10, and is electrically connected to the first columnar wiring 31. Thus, the first external terminal 41 is electrically connected to a first end (first pad portion 21) of the coil 15. The second external terminal 42 is in contact with an end surface of the second columnar wiring 32 exposed from the first main surface 10*a* of the element body 10, and is electrically connected to the second columnar wiring 32. Thus, the second external terminal 42 is electrically connected to a second end (the second pad portion 22) of the coil 15.

The first external terminal 41 is in contact with the first main surface 10*a* and the end surface of the first columnar wiring 31. The second external terminal 42 is in contact with the first main surface 10*a* and the end surface of the second columnar wiring 32. According to this, since the first external terminal 41 spreads across the first main surface 10*a* and the first columnar wiring 31, and the second external terminal 42 spreads across the first main surface 10*a* and the second columnar wiring 32, sizes of the respective first and second external terminals 41 and 42 can be controlled, and design of the first and second external terminals 41 and 42 can be selected from a viewpoint of mounting properties and mechanical strength.

Each of the first external terminal 41 and the second external terminal 42 is preferably in contact with the magnetic powder of the element body 10. According to this, adhesion strength between each of the first external terminal 41 and the second external terminal 42, and the element body 10 is improved.

The insulating layer 60 covers a lower surface of the coil 15. Thus, insulation properties of the coil 15 can be improved. The insulating layer 60 is made of an insulating material that does not contain a magnetic substance. The insulating layer 60 is, for example, an organic resin such as an epoxy resin, a phenol resin, a polyimide resin, a liquid crystal polymer, or a combination thereof, a sintered body such as glass or alumina, or a thin film such as a silicon oxide film, a silicon nitride film, or a silicon oxynitride film.

The coating film 50 is made of an insulating material. The material of the coating film 50 is, for example, the same as the material of the insulating layer 60. The coating film 50 exposes respective end surfaces of the first and second external terminals 41 and 42. With the coating film 50, a short circuit between the first external terminal 41 and the second external terminal 42 can be suppressed. Preferably, the coating film 50 contains a black colorant. With this, it is possible to hide scratches on the surface of the element body 10, and to improve a rate of good appearance. The black colorant is, for example, a colorant to which a number including black is assigned in a color index, and specific examples thereof include carbon black-based pigments such as carbon black, ketjen black, perylene black, and titanium oxide, and graphite-based pigments, iron oxide-based pigments, cobalt oxide-based pigments, and anthraquinone-based pigments.

According to the above-described configuration, the first pad portion 21 extends in a direction that intersects the connection direction L and that is a direction in which the inner peripheral surface 20*c* of the coil wiring portion 20 is approached, and the second pad portion 22 extends in a direction that intersects the connection direction L and that is a direction in which the inner peripheral surface 20*c* of the coil wiring portion 20 is approached. According to this, it is possible to prevent the first pad portion 21 and the second pad portion 22 from approaching each other, and to reduce a possibility of a short circuit between the first pad portion 21 and the second pad portion 22 having a greatest potential difference in the coil 15. In addition, it is possible to prevent the first pad portion 21 and the second pad portion 22 from extending outward in the radial direction of the coil 15, to reduce the inductor component 1 in size. Additionally, an area of the first pad portion 21 can be increased, and connection reliability between the first pad portion 21 and the first columnar wiring 31 can be improved.

On the other hand, for example, when the first pad portion and the second pad portion are extended in the connection direction L, the first pad portion and the second pad portion come close to each other and are highly likely to be short-circuited. In addition, when the first pad portion and the second pad portion are extended outward in the radial direction of the coil, it is necessary to increase the element body in size, and the inductor component is increased in size.

Figure 3:
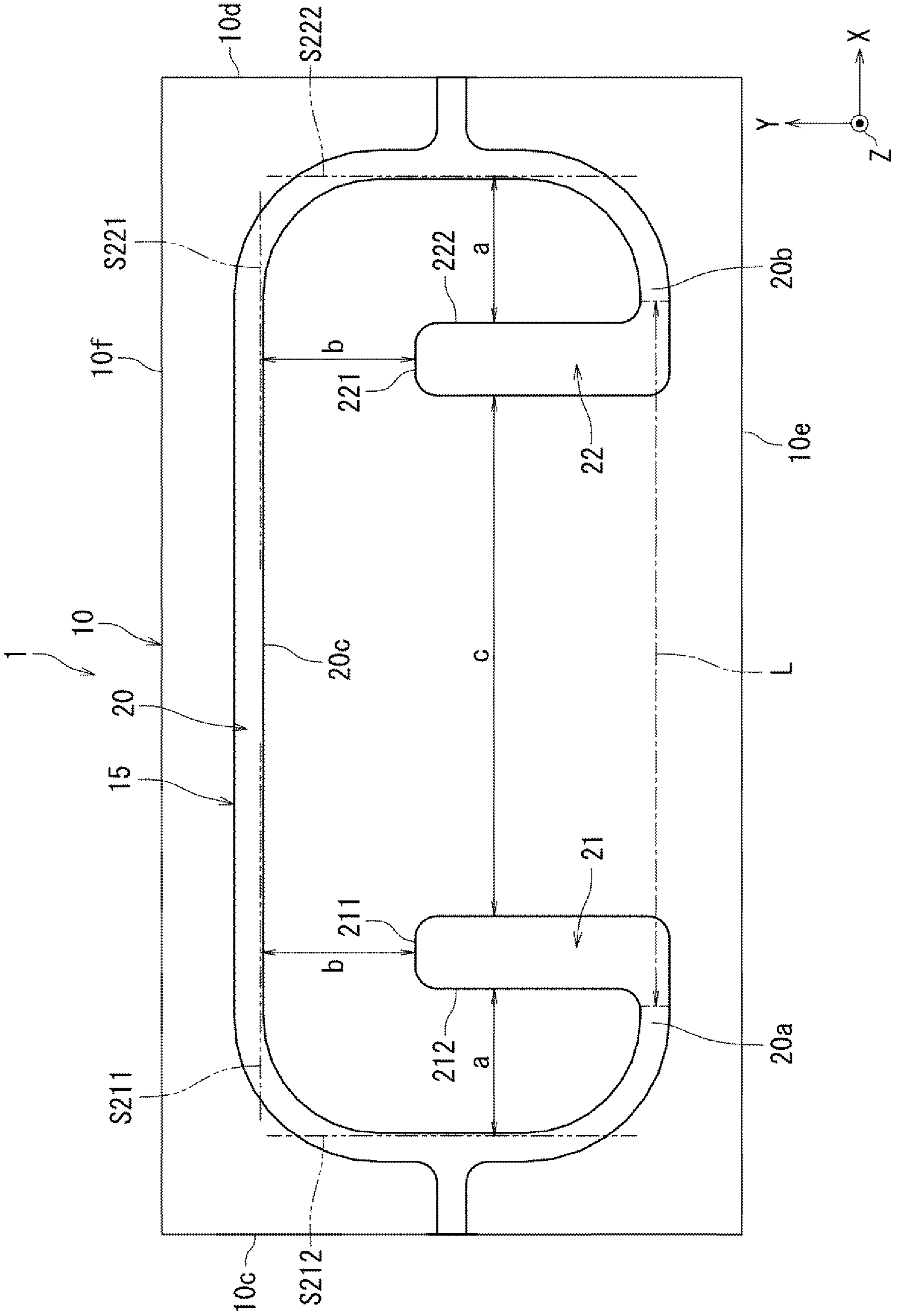
FIG. 3 is a plan view of the inductor component.

FIG. 3 is a plan view of the inductor component. In FIG. 3, for convenience, only the element body 10 and the coil 15 are drawn, and these are illustrated by solid lines. As illustrated in FIG. 3, when viewed from the direction orthogonal to the first main surface 10*a*, the first pad portion 21 has a linear first plane 211 that is a distal end surface in the extending direction of the first pad portion 21, and faces the inner peripheral surface 20*c* of the coil wiring portion 20. A shortest distance between the first plane 211 and the inner peripheral surface 20*c* of the coil wiring portion 20 is not a minimum among lengths between an outer surface of the first pad portion 21 and the inner peripheral surface 20*c* of the coil wiring portion 20. According to this, it is possible to reduce a possibility of a short circuit between the first plane 211 of the first pad portion 21 and the inner peripheral surface 20*c* of the coil wiring portion 20.

To be specific, when viewed from the direction orthogonal to the first main surface 10*a*, the first pad portion 21 has the linear first plane 211 extending in the connection direction L and facing the inner peripheral surface 20*c* of the coil wiring portion 20, and the linear second plane 212 extending in the direction orthogonal to the connection direction L and facing the inner peripheral surface 20*c* of the coil wiring portion 20. The first plane 211 refers to a surface at a location closest to the inner peripheral surface 20*c* of the coil wiring portion 20 among surfaces extending in parallel to the connection direction L. The second plane 212 refers to a surface at a location closest to the inner peripheral surface 20*c* of the coil wiring portion 20 among surfaces extending in the direction orthogonal to the connection direction L.

A surface parallel to the first plane 211 and tangent to a part, of the inner peripheral surface 20*c* of the coil wiring portion 20, facing the first plane 211 is defined as a first virtual surface S211, and a surface parallel to the second plane 212 and tangent to a part, of the inner peripheral surface 20*c* of the coil wiring portion 20, facing the second plane 212 is defined as a second virtual surface S212. At this time, a first distance a between the second virtual surface S212 and the second plane 212 is less than a second distance b between the first virtual surface S211 and the first plane 211.

According to the above-described configuration, since the first distance a is less than the second distance b, it is possible to reduce a possibility of a short circuit between the first plane 211 of the first pad portion 21 and a part, of the inner peripheral surface 20*c* of the coil wiring portion 20, facing the first plane 211. Even if a short circuit occurs between the second virtual surface S212 and the second plane 212, a variation in a coil length is suppressed as compared to a case where a short circuit occurs between the first virtual surface S211 and the first plane 211, and thus influence of a layer short can be suppressed.

Note that, the first distance a may be equal to or greater than the second distance b. In this case, the first pad portion 21 can be increased in the extending direction thereof. Thus, a size of the first pad portion 21 can be increased, and the connection reliability between the first pad portion 21 and the first columnar wiring 31 can be improved.

Also, the second pad portion 22 may have a similar configuration to that of the first pad portion 21, and has a similar effect to that of the first pad portion 21. That is, when viewed from the direction orthogonal to the first main surface 10*a*, the second pad portion 22 has a linear first plane 221 that is a distal end surface in the extending direction of the second pad portion 22 and that faces the inner peripheral surface 20*c* of the coil wiring portion 20. A shortest distance between the first plane 221 and the inner peripheral surface 20*c* of the coil wiring portion 20 is not a minimum among lengths between an outer surface of the second pad portion 22 and the inner peripheral surface 20*c* of the coil wiring portion 20.

To be specific, the second pad portion 22 has the linear first plane 221 extending in the connection direction L and facing the inner peripheral surface 20*c* of the coil wiring portion 20, and a linear second plane 222 extending in the direction orthogonal to the connection direction L and facing the inner peripheral surface 20*c* of the coil wiring portion 20. A surface parallel to the first plane 221 and tangent to a part, of the inner peripheral surface 20*c* of the coil wiring portion 20, facing the first plane 221 is defined as a first virtual surface S221, and a surface parallel to the second plane 222 and tangent to a part, of the inner peripheral surface 20*c* of the coil wiring portion 20, facing the second plane 222 is defined as a second virtual surface S222. At this time, the first distance a between the second virtual surface S222 and the second plane 222 is less than the second distance b between the first virtual surface S221 and the first plane 221. Note that, the first distance a may be equal to or greater than the second distance b.

As illustrated in FIG. 3, in the first pad portion 21, it is preferable that the first distance a between the second virtual surface S212 and the second plane 212 be equal to or greater than twice the particle size D50 of the magnetic powder.

Here, unless otherwise specified, the particle size D50 of the magnetic powder is measured from a scanning electron microscope (SEM) image of a cross-section of a central portion in a longitudinal direction of the element body 10 of the inductor component 1. At this time, the SEM image preferably includes 10 or more of the magnetic powders, and is acquired at a magnification of 2000 times, for example. The SEM image as described above is acquired at three or more locations from the above-described cross-section, the magnetic powder and the others are classified by binarization or the like, an equivalent circle diameter of the magnetic powder in the SEM image is calculated, and an intermediate value (median diameter) when the equivalent circle diameters are arranged in order of magnitude is defined as the particle size D50 of the magnetic powder.

According to the above-described configuration, by increasing the distance between the second virtual surface S212 and the second plane 212 to be greater than the magnetic powder, it is possible to further reduce a possibility of a short circuit between the second virtual surface S212 and the second plane 212.

Also, the second pad portion 22 may have a similar configuration to that of the first pad portion 21, and has a similar effect to that of the first pad portion 21. That is, in the second pad portion 22, the first distance a between the second virtual surface S222 and the second plane 222 is equal to or greater than twice the particle size D50 of the magnetic powder.

As illustrated in FIG. 3, preferably, in the first pad portion 21, the shortest distance c between the first pad portion 21 and the second pad portion 22 is greater than the first distance a between the second virtual surface S212 and the second plane 212 when viewed from the direction orthogonal to the first main surface 10*a*.

According to the above-described configuration, it is possible to further reduce the possibility of a short circuit between the first pad portion 21 and the second pad portion 22 having the greatest potential difference in the coil 15. Even if a short circuit occurs between the second virtual surface S212 and the second plane 212, a variation in the coil length is suppressed compared to a case where a short circuit occurs between the first pad portion 21 and the second pad portion 22, and thus influence of a layer short can be suppressed.

Note that, the shortest distance c may be equal to or less than the first distance a. In this case, since the first pad portion 21 and the second pad portion 22 can be brought close to each other, a length of the coil wiring portion 20 can be increased. Thus, the coil length can be increased, and the inductance can be increased.

Also, the second pad portion 22 may have a similar configuration to that of the first pad portion 21, and has a similar effect to that of the first pad portion 21. That is, in the second pad portion 22, the shortest distance c is greater than the first distance a. Note that, the shortest distance c may be equal to or less than the first distance a.

As illustrated in FIG. 3, the shortest distance c between the first pad portion 21 and the second pad portion 22 is preferably equal to or greater than twice the particle size D50 of the magnetic powder. According to the above-described configuration, by increasing the distance between the first pad portion 21 and the second pad portion 22 to be greater than the magnetic powder, it is possible to further reduce the possibility of a short circuit between the first pad portion 21 and the second pad portion 22.

As illustrated in FIG. 3, preferably, in the first pad portion 21, the first distance a is less than the second distance b, and the second distance b is less than the shortest distance c. For example, the first distance a is 200 μm, the second distance b is 210 μm, and the shortest distance c is 720 μm. According to the above-described configuration, since the shortest distance c is greater than the first distance a and the second distance b, it is possible to further reduce the possibility of a short circuit between the first pad portion 21 and the second pad portion 22 having the greatest potential difference. Note that, the second distance b may be less than the shortest distance c regardless of a magnitude relation between the first distance a and the second distance b.

Also, the second pad portion 22 may have a similar configuration to that of the first pad portion 21, and has a similar effect to that of the first pad portion 21.

Manufacturing Method

Next, a manufacturing method of the inductor component 1 will be described. FIG. 4A to FIG. 4M correspond to the A-A section (FIG. 2) in FIG. 1.

Figure 4A:
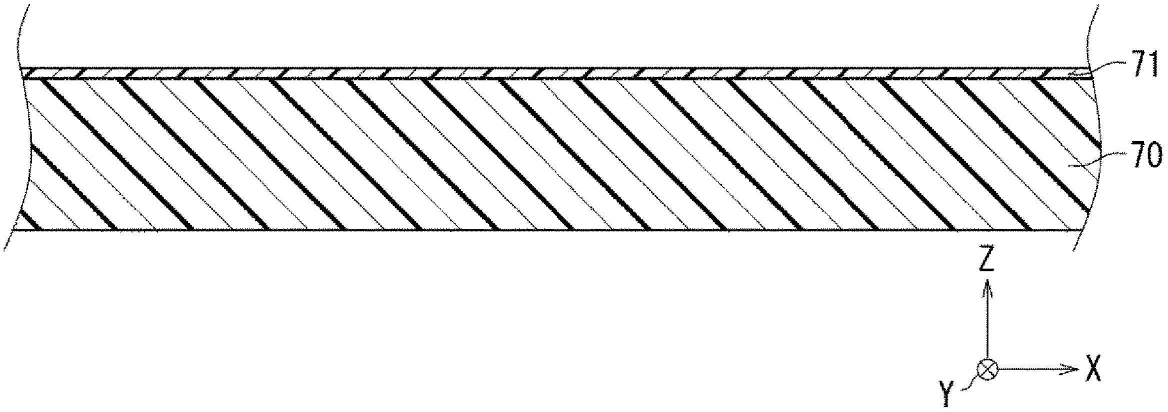
FIG. 4A is an explanatory view for explaining a method of manufacturing the inductor component.
Figure 4B:
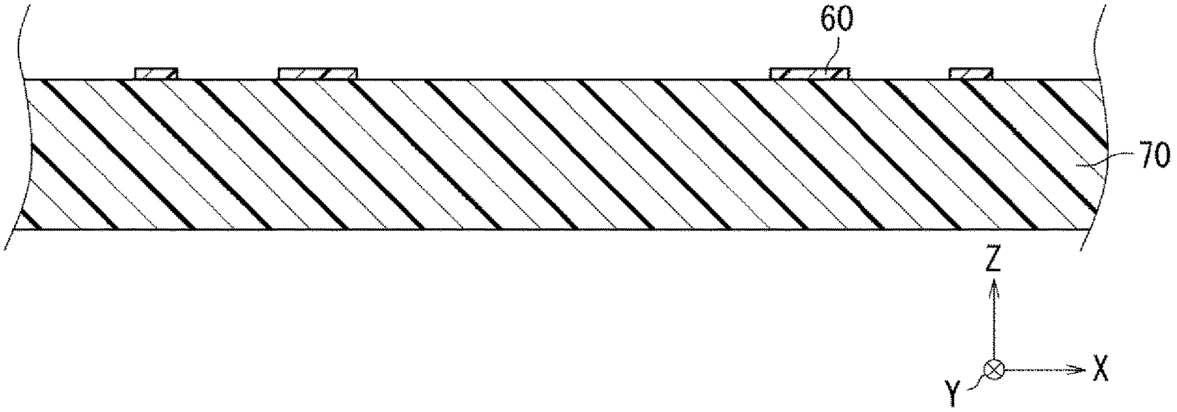
FIG. 4B is an explanatory view for explaining the method of manufacturing the inductor component.

As illustrated in FIG. 4A, a base substrate 70 is prepared. The base substrate 70 is made of an inorganic material such as ceramic, glass, or silicon, for example. An insulating layer 71 is applied to the base substrate 70. As illustrated in FIG. 4B, a predetermined pattern is formed and cured on the insulating layer 71 using a photolithography method, to form the insulating layer 60.

Figure 4C:
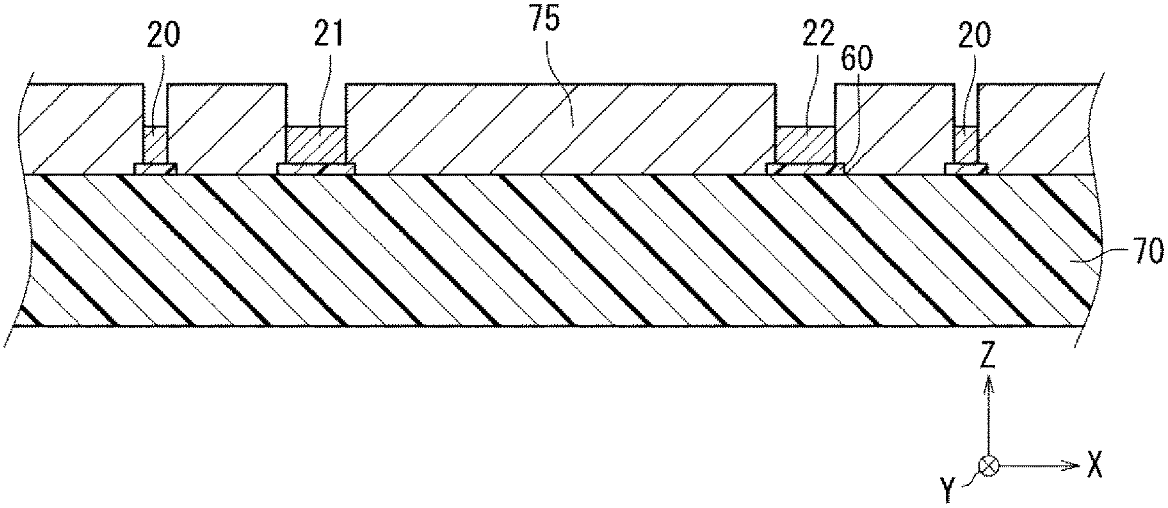
FIG. 4C is an explanatory view for explaining the method of manufacturing the inductor component.

As illustrated in FIG. 4C, a seed layer (Ti/Cu) (not illustrated) is formed on a main surface of the base substrate 70 including an upper surface of the insulating layer 60 by a known method such as a sputtering method or a vapor deposition method. Thereafter, a DFR (dry film resist) 75 is attached, and an opening having a predetermined shape is formed in the DFR 75 by using a photolithography method. Then, by using an electrolytic plating method, while feeding electricity to the seed layer, the coil wiring portion 20, the first pad portion 21, and the second pad portion 22 are formed on the insulating layer 60.

Figure 4D:
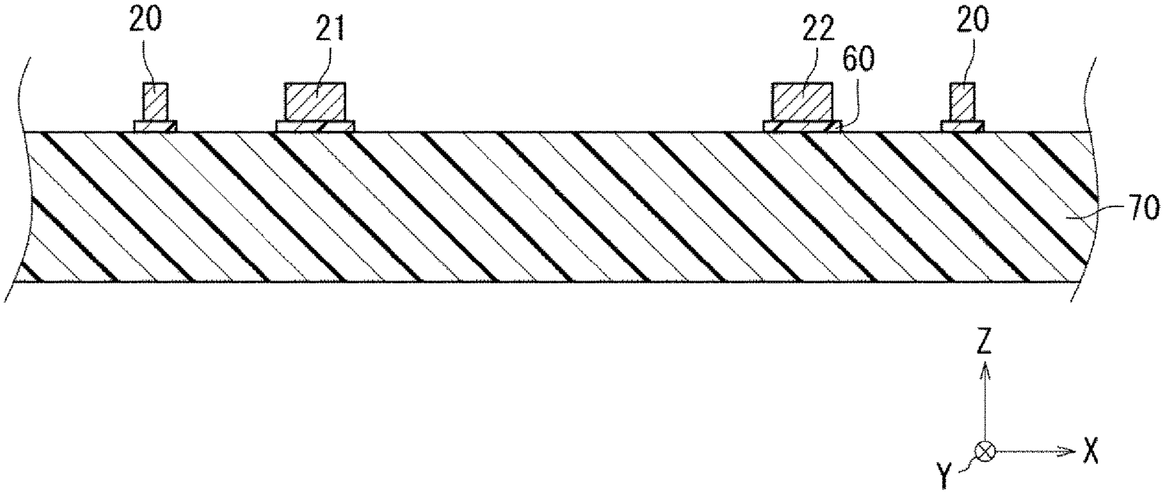
FIG. 4D is an explanatory view for explaining the method of manufacturing the inductor component.

As illustrated in FIG. 4D, the DFR 75 is peeled off. At this time, the seed layer may be used for electrolytic plating of a columnar wiring without etching the seed layer, or the seed layer may be etched to form a seed layer for forming a columnar wiring again.

Figure 4E:
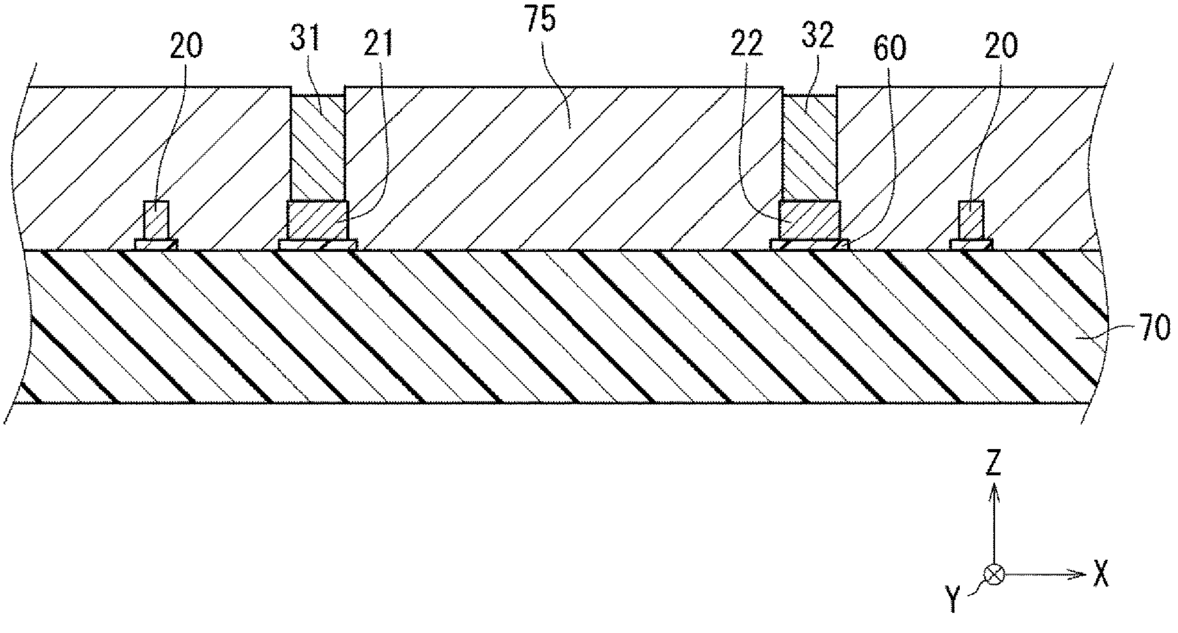
FIG. 4E is an explanatory view for explaining the method of manufacturing the inductor component.
Figure 4F:
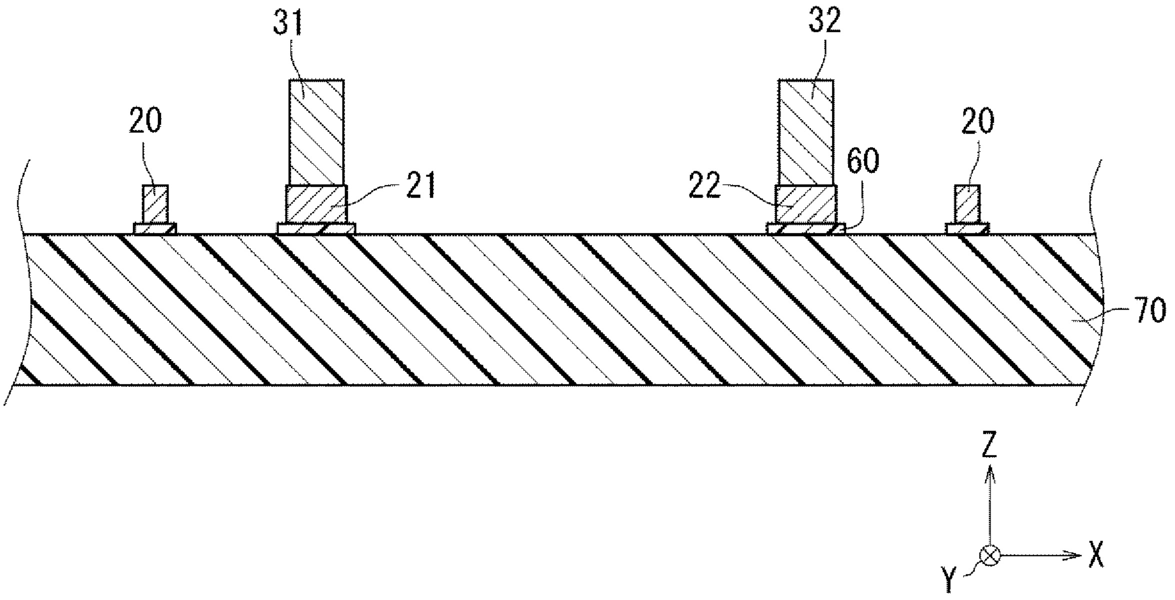
FIG. 4F is an explanatory view for explaining the method of manufacturing the inductor component.
Figure 4G:
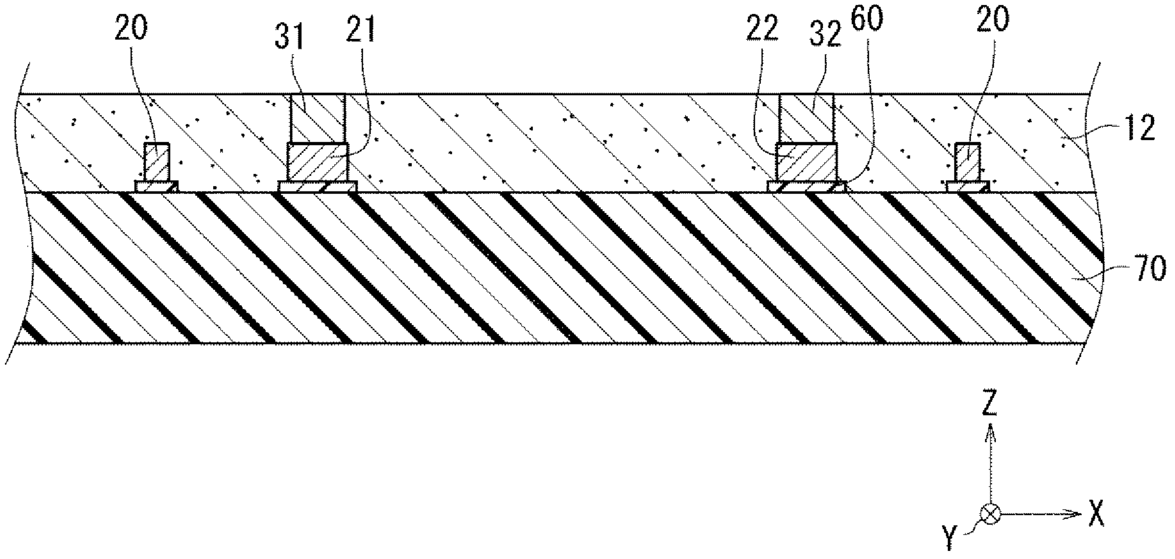
FIG. 4G is an explanatory view for explaining the method of manufacturing the inductor component.

As illustrated in FIG. 4E, the DFR 75 is attached again, and an opening having a predetermined shape is formed in the DFR 75 by using a photolithography method. The openings are through-holes respectively corresponding to a location where the first columnar wiring 31 is provided on the first pad portion 21, and a location where the second columnar wiring 32 is provided on the second pad portion 22. Using electrolytic plating, the first columnar wiring 31 is provided on the first pad portion 21, and the second columnar wiring 32 is provided on the second pad portion 22. As illustrated in FIG. 4F, the DFR 75 is peeled off and the seed layer is etched.

As illustrated in 4G, a magnetic sheet to be the second magnetic layer 12 is pressure-bonded from above the main surface of the base substrate 70 toward the coil wiring portion 20, and the coil wiring portion 20, the first pad portion 21, the second pad portion 22, the first columnar wiring 31, and the second columnar wiring 32 are covered with the second magnetic layer 12. Thereafter, an upper surface of the second magnetic layer 12 is ground, and the end surface of the first columnar wiring 31 and the end surface of the second columnar wiring 32 are exposed from the upper surface of the second magnetic layer 12.

Figure 4H:
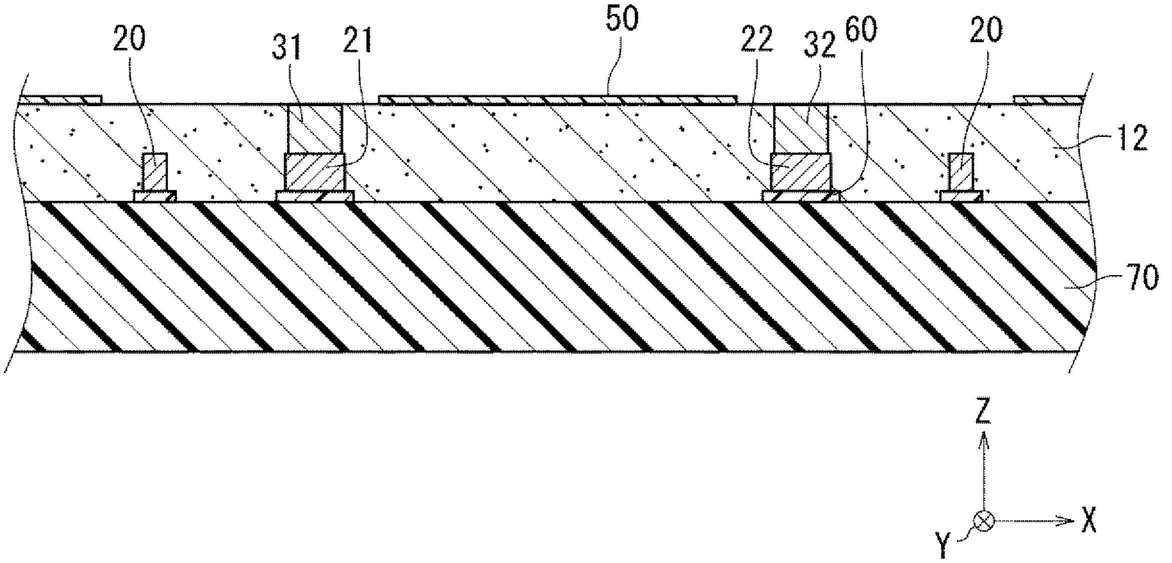
FIG. 4H is an explanatory view for explaining the method of manufacturing the inductor component.

As illustrated in FIG. 4H, the coating film 50 is applied to the upper surface of the second magnetic layer 12. Then, the coating film 50 is formed into a predetermined pattern and cured by using a photolithography method. The predetermined pattern has a shape having an opening at a location corresponding to the first external terminal 41 and an opening at a location corresponding to the second external terminal 42.

Figure 4I:
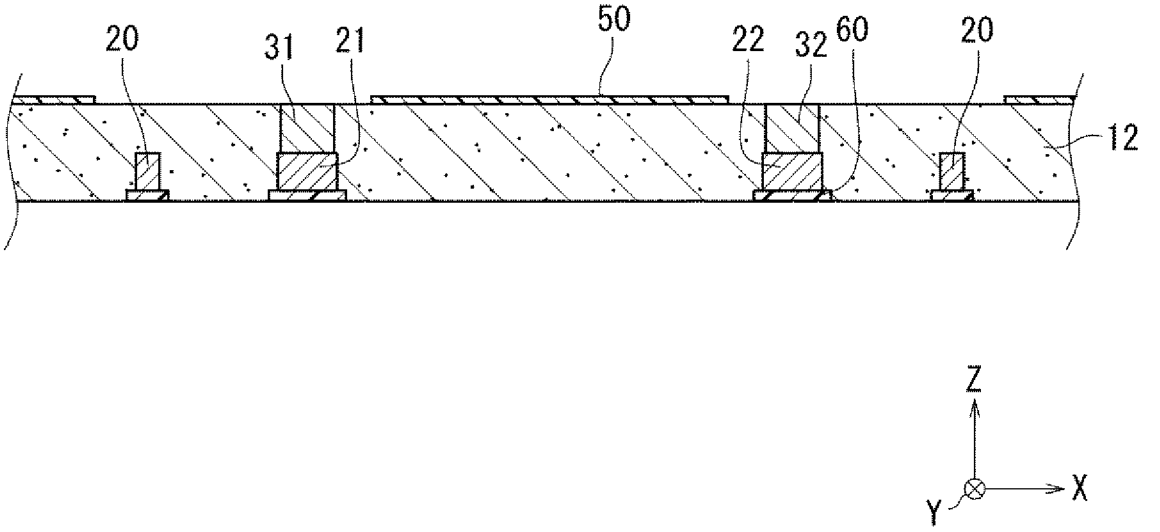
FIG. 4I is an explanatory view for explaining the method of manufacturing the inductor component.
Figure 4J:
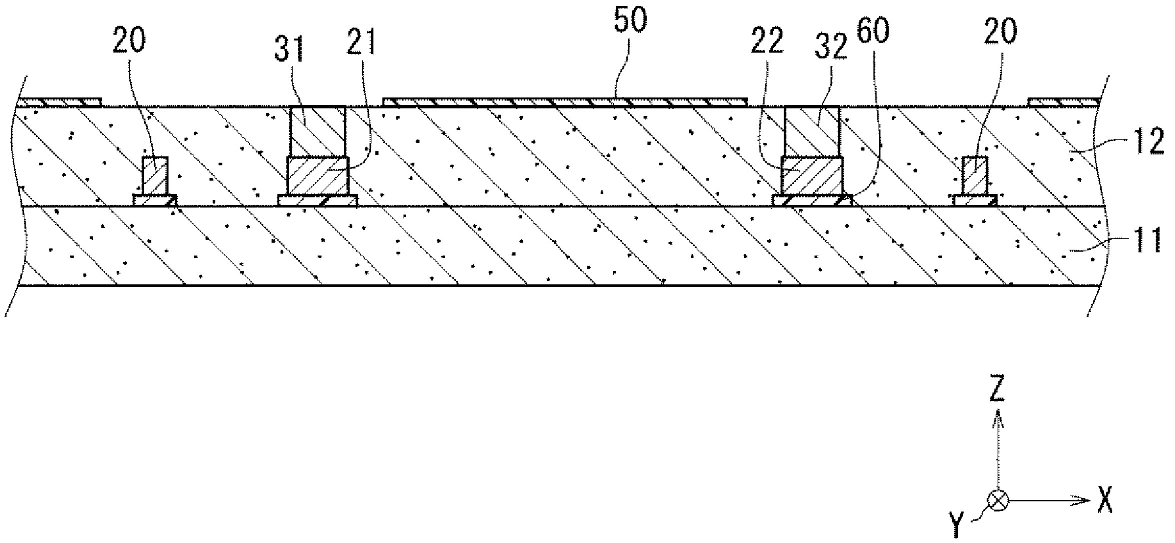
FIG. 4J is an explanatory view for explaining the method of manufacturing the inductor component.

As illustrated in FIG. 4I, the base substrate 70 is removed by polishing. At this time, a part or all of the insulating layer 60 may be removed. As illustrated in FIG. 4J, another magnetic sheet to be the first magnetic layer 11 is pressure-bonded from below the coil wiring portion 20 toward the coil wiring portion 20, and the coil wiring portion 20 is covered with the first magnetic layer 11. Thereafter, the first magnetic layer 11 is ground to have a predetermined thickness.

Figure 4K:
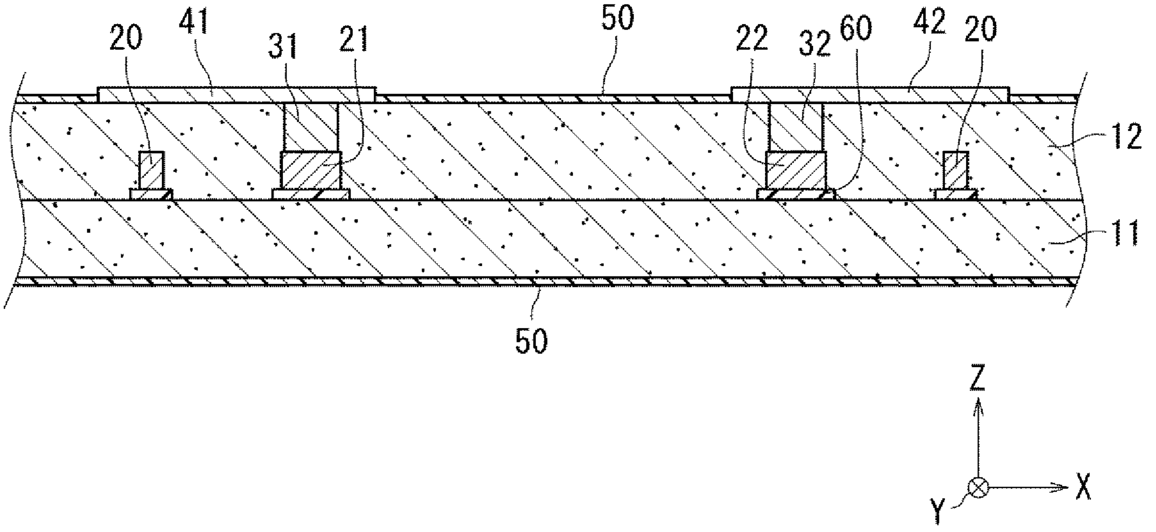
FIG. 4K is an explanatory view for explaining the method of manufacturing the inductor component.

As illustrated in FIG. 4K, the first external terminal 41 and the second external terminal 42 are formed in the openings of the coating film 50, respectively. The first external terminal 41 is in contact with the end surface of the first columnar wiring 31 and the upper surface of the second magnetic layer 12. The second external terminal 42 is in contact with the end surface of the second columnar wiring 32 and the upper surface of the second magnetic layer 12. Further, the coating film 50 is applied to a lower surface of the first magnetic layer 11, and cured.

Figure 4L:
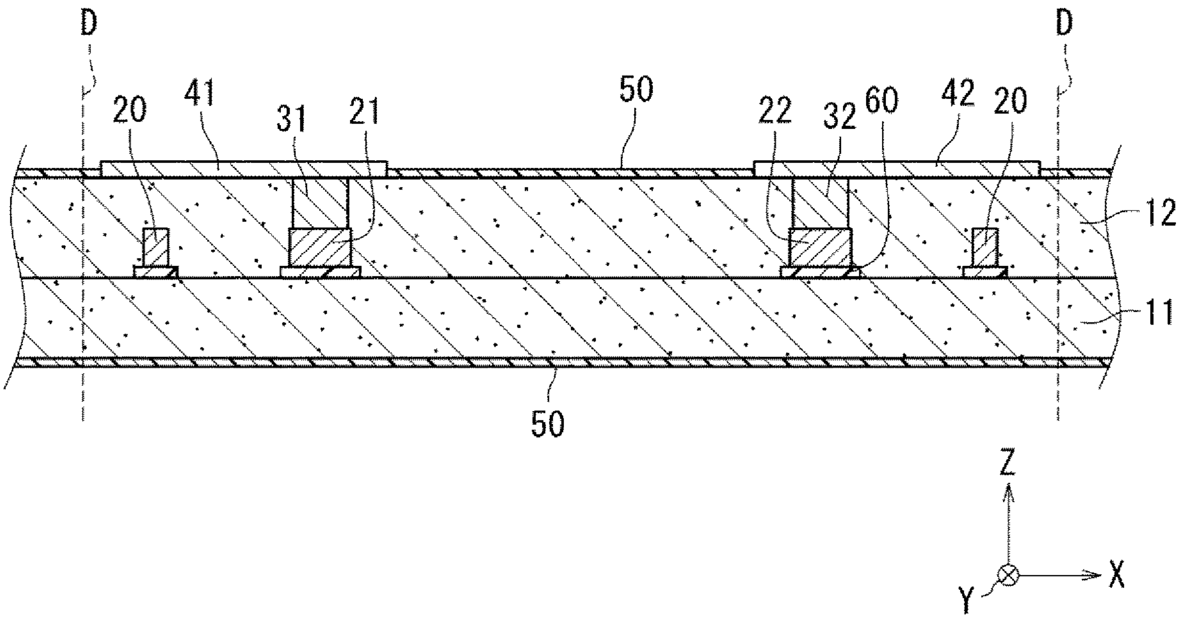
FIG. 4L is an explanatory view for explaining the method of manufacturing the inductor component.
Figure 4M:
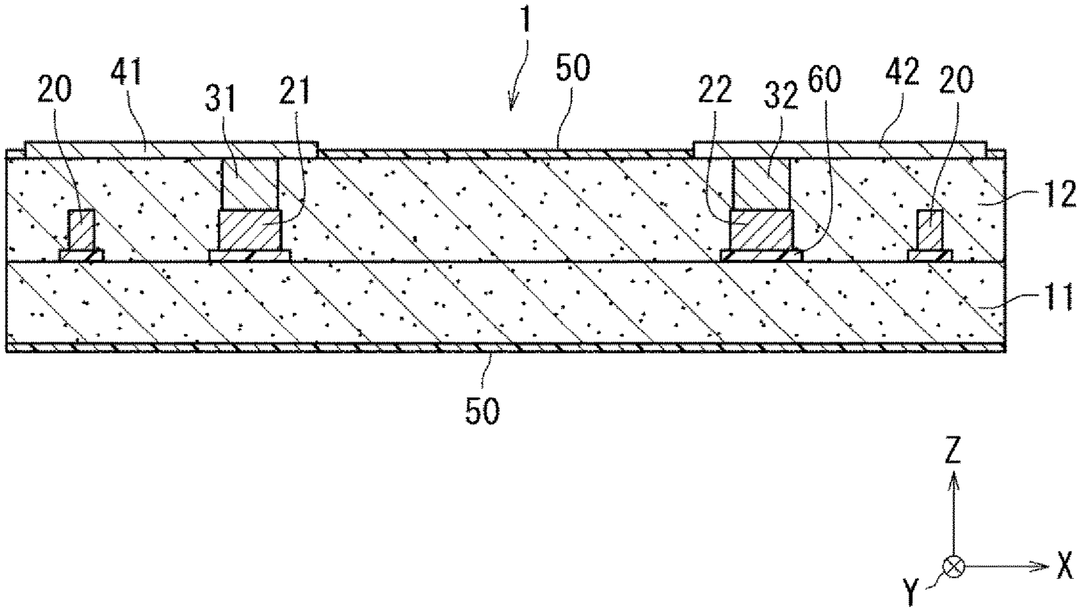
FIG. 4M is an explanatory view for explaining the method of manufacturing the inductor component.

As illustrated in FIG. 4L, an inductor component is made as an individual piece along cut lines D, and as illustrated in FIG. 4M, the inductor component 1 is manufactured.

WORKING EXAMPLES

Next, working examples will be described.

Figure 5A:
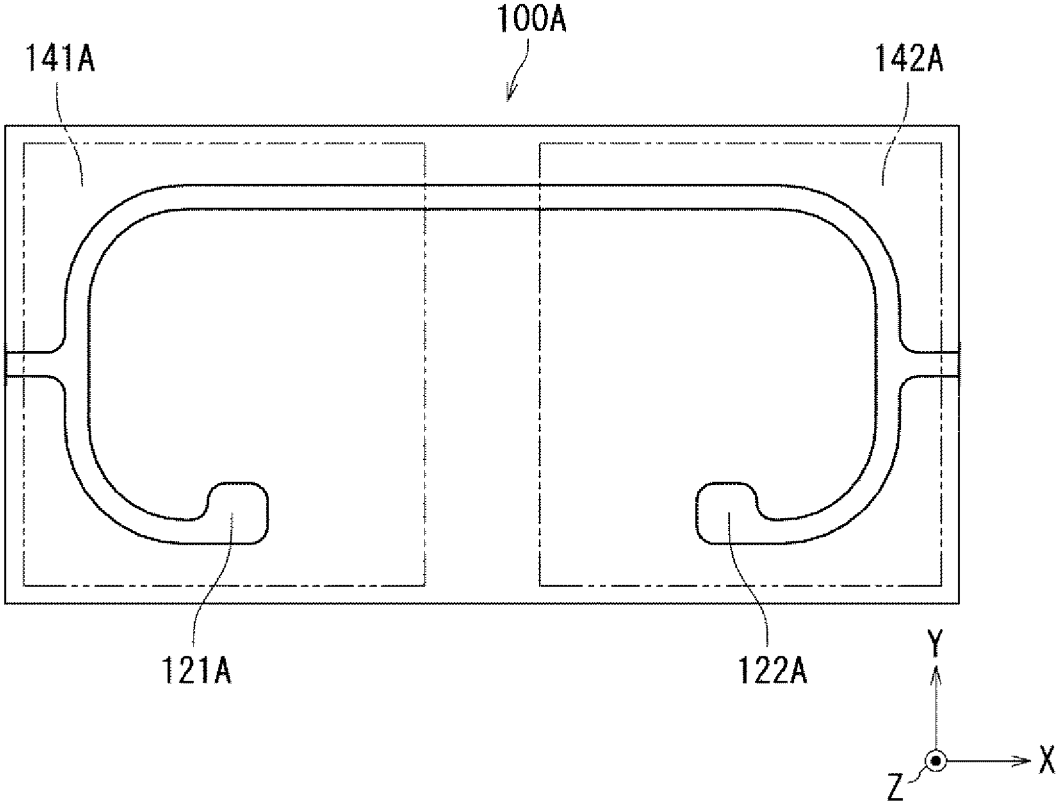
FIG. 5A is a plan view illustrating an inductor component of a first comparative example.
Figure 5B:
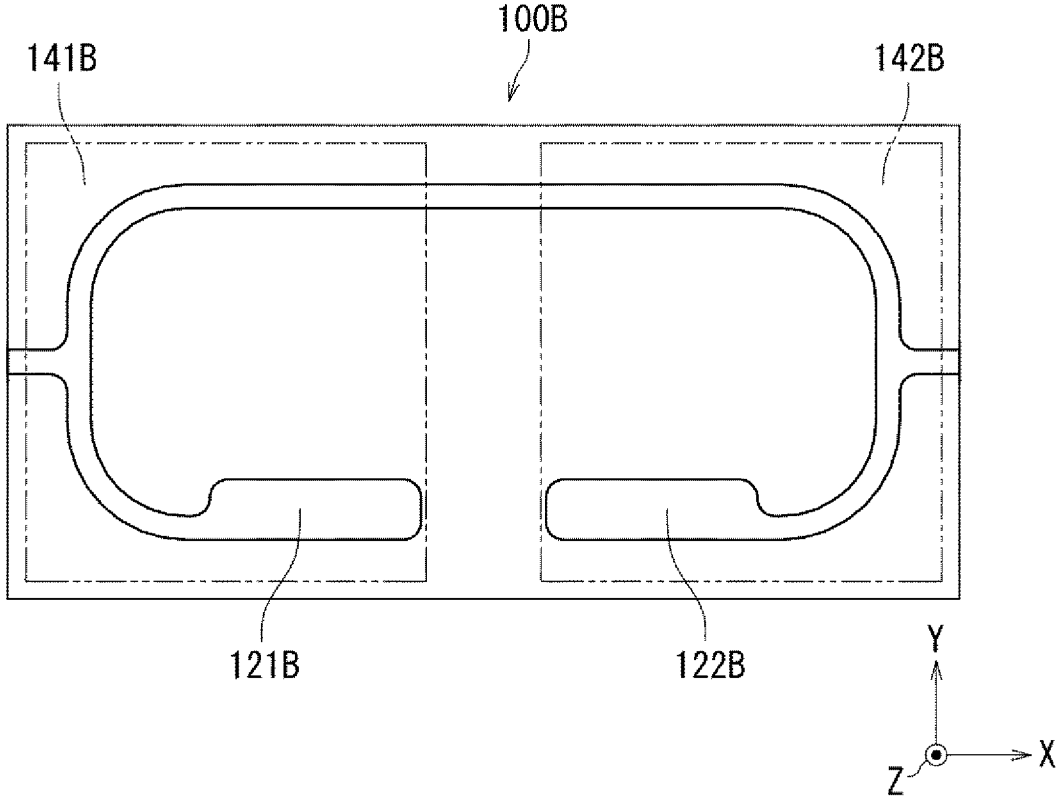
FIG. 5B is a plan view illustrating an inductor component of a second comparative example.
Figure 5C:
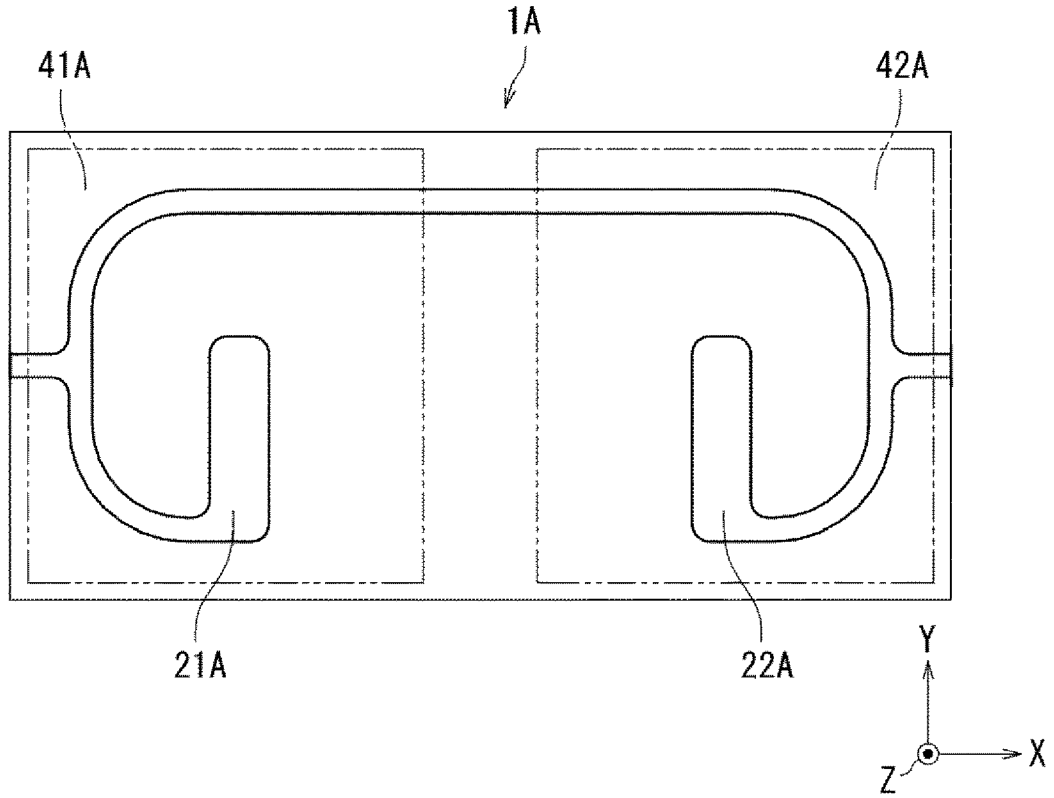
FIG. 5C is a plan view illustrating an inductor component of a first working example.
Figure 5D:
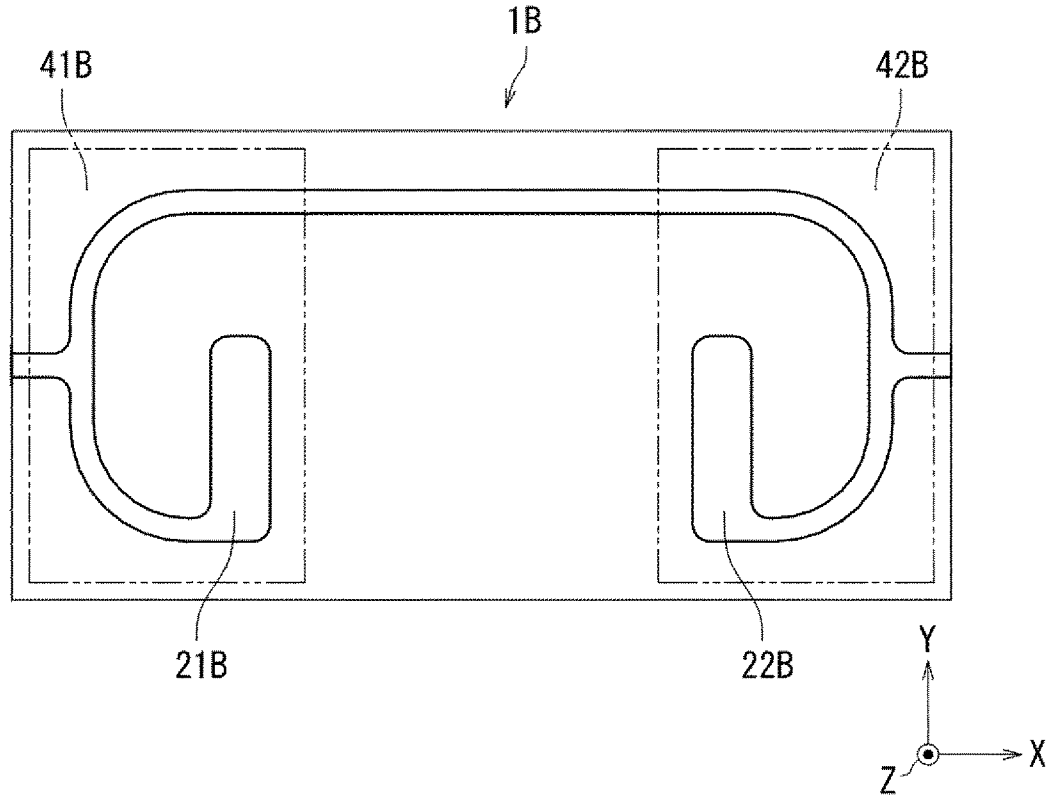
FIG. 5D is a plan view illustrating an inductor component of a second working example.

FIG. 5A illustrates an inductor component 100A of a first comparative example, and FIG. 5B illustrates an inductor component 100B of a second comparative example. FIG. 5C illustrates an inductor component 1A of a first working example, and FIG. 5D illustrates an inductor component 1B of a second working example. In each of FIG. 5A to FIG. 5D, only an element body, a coil, and external terminals are illustrated for convenience, the element body and the coil are indicated by solid lines, and the external terminals are indicated by two dot chain lines. Although a columnar wiring is omitted, the columnar wiring has substantially the same size as that of a pad portion when viewed from the Z direction, and has a shape corresponding to the pad portion.

As illustrated in 5A, in the inductor component 100A of the first comparative example, each of a first pad portion 121A and a second pad portion 122A is quadrangular, and has a size of 100 μm×100 μm. A distance between a first external terminal 141A and a second external terminal 142A is 200 μm.

As illustrated in FIG. 5B, in the inductor component 100B of the second comparative example, a first pad portion 121B extends in the forward X direction as compared to the first pad portion 121A in FIG. 5A, and a second pad portion 122B extends in the reverse X direction as compared to the second pad portion 122A in FIG. 5A. Hereinafter, a length difference in the X direction between the first pad portion 121B and the first pad portion 121A, and a length difference in the X direction between the second pad portion 122B and the second pad portion 122A are each referred to as an extension amount of a pad portion. A distance between a first external terminal 141B and a second external terminal 142B is the same as the distance between the first external terminal 141A and the second external terminal 142A in FIG. 5A.

As illustrated in FIG. 5C, in the inductor component 1A of the first working example, a first pad portion 21A extends in the forward Y direction as compared to the first pad portion 121A in FIG. 5A, and a second pad portion 22A extends in the forward Y direction as compared to the second pad portion 122A in FIG. 5A. Hereinafter, a length difference in the Y direction between the first pad portion 21A and the first pad portion 121A, and a length difference in the Y direction between the second pad portion 22A and the second pad portion 122A are each referred to as an extension amount of a pad portion. A distance between a first external terminal 41A and a second external terminal 42A is the same as the distance between the first external terminal 141A and the second external terminal 142A in FIG. 5A.

As illustrated in FIG. 5D, in the inductor component 1B of the second working example, a first pad portion 21B has the same shape as that of the first pad portion 21A in FIG. 5C, and a second pad portion 22B has the same shape as that of the second pad portion 22A in FIG. 5C. A distance between a first external terminal 41B and a second external terminal 42B is 600 μm, which is greater than the distance between the first external terminal 41A and the second external terminal 42A in FIG. 5C.

Figure 6:
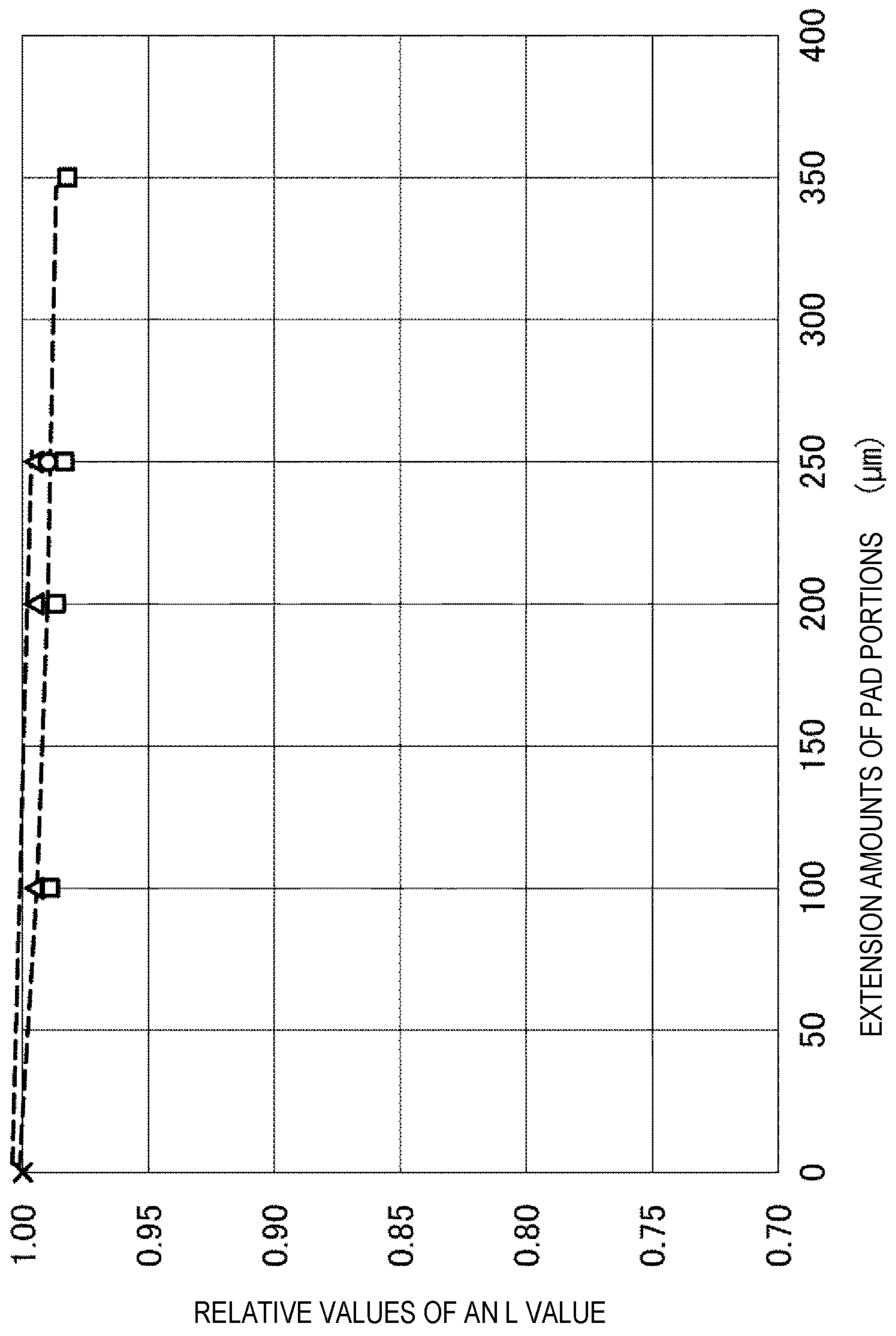
FIG. 6 is a graph showing a relationship between relative values of an L value and extension amounts of pad portions in the first comparative example, the second comparative example, the first working example, and the second working example.
Figure 7:
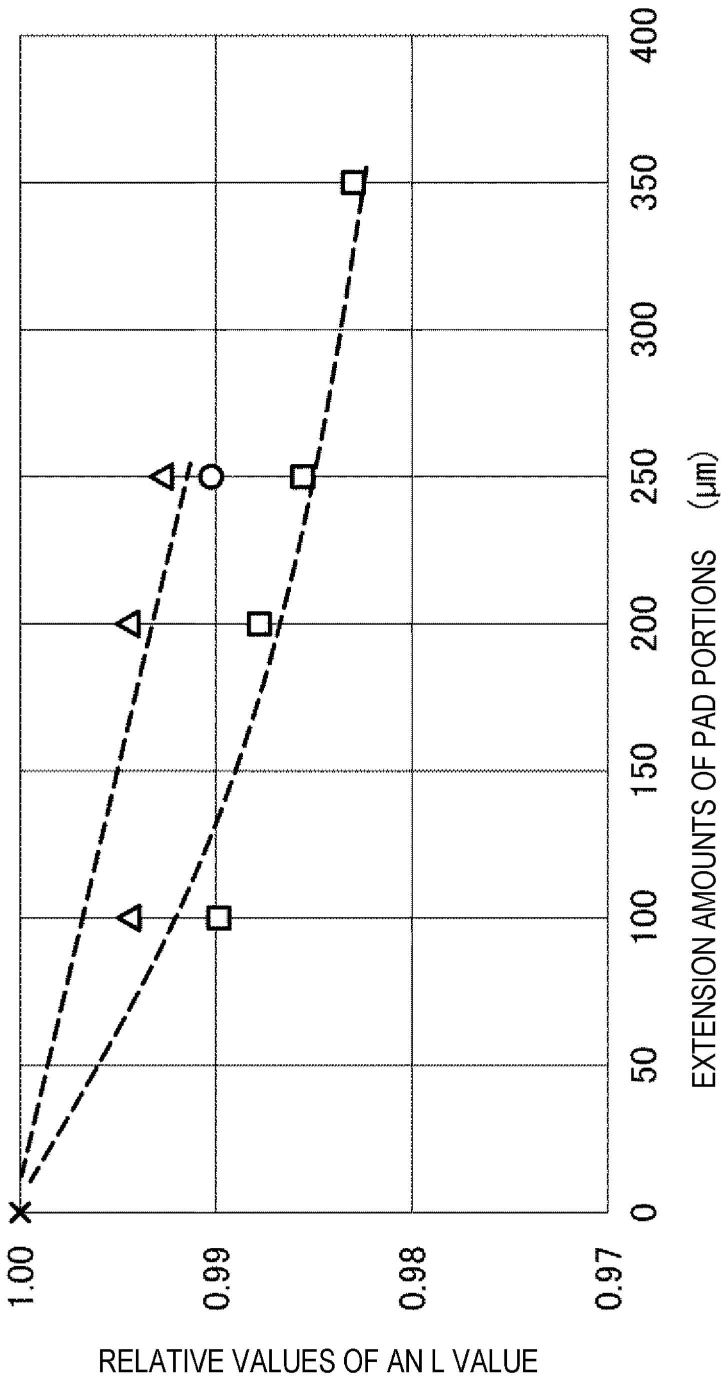
FIG. 7 is a graph of an enlarged part of FIG. 6.

FIG. 6 shows a relationship between relative values of an L value and extension amounts of pad portions in the above first comparative example, the above second comparative example, the above first working example, and the above second working example. FIG. 7 is a graph of an enlarged part of FIG. 6.

In FIG. 6 and FIG. 7, an x mark denotes the first comparative example, a triangle mark denotes the second comparative example, a square mark denotes the first working example, and a circle mark denotes the second working example. A relative value of an L value indicates a relative value when an L value of the first comparative example is defined as 1. As described above, an extension amount of a pad portion refers to a length difference from a pad portion of the first comparative example.

As shown in FIG. 6 and FIG. 7, in each of the second comparative example and the first working example, the relative value of the L value slightly decreased as the extension amount of the pad portion increased. It is considered that this is because volume of the magnetic layer decreases. The decrease in the relative value of the L value is within an allowable range at the time of manufacturing, and there is no problem in quality. On the other hand, in each of the second comparative example and the first working example, as the extension amount of the pad portion increases, an area of the columnar wiring also increases, and as a result, a contact area with the external terminal increases, and connection reliability is improved.

In the second working example, the relative value of the L value is greater, as compared to the first working example. This is because, since the distance between the two external terminals in the second working example is greater than the distance between the two external terminals in the first working example, it is possible to reduce obstruction of a flow of magnetic flux of the coil by the external terminals in the second working example.

As described above, in each of the first comparative example, the second comparative example, the first working example, and the second working example, the L value can be ensured. However, in the first comparative example, since the pad portion is small, a contact area with the external terminal is small, and connection reliability is lowered. Further, in the second comparative example, there is a high possibility that the two pad portions come close to each other and are short-circuited. On the other hand, in the first working example and the second working example, since a contact area with the external terminal is increased, connection reliability is improved, and since the two pad portions do not come close to each other, a possibility of a short circuit can be reduced. Furthermore, in the second working example, it is possible to reduce obstruction of a flow of magnetic flux and to suppress a decrease in the L value.

Second Embodiment

Figure 8:
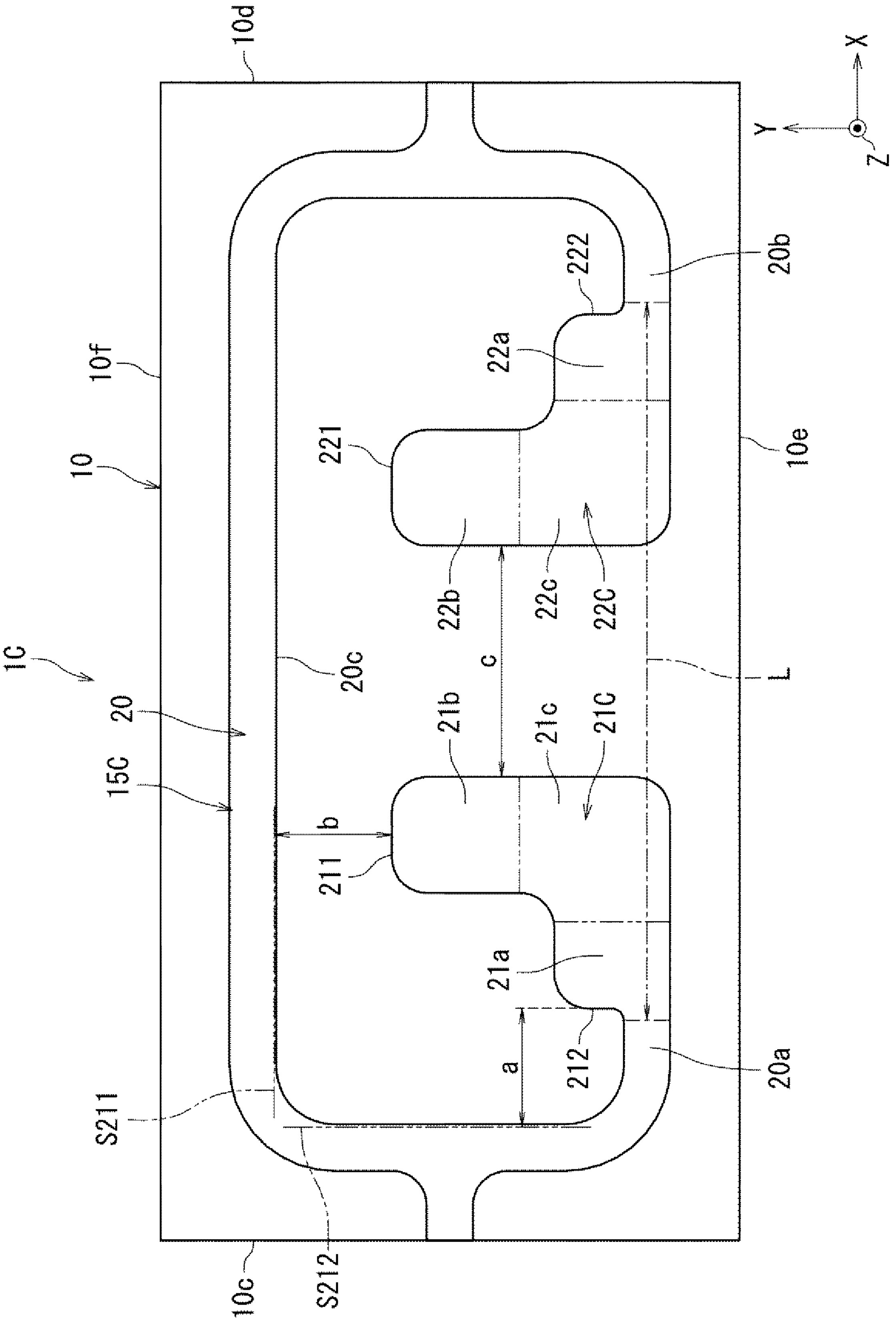
FIG. 8 is a plan view illustrating a second embodiment of the inductor component.

FIG. 8 is a plan view illustrating a second embodiment of the inductor component. In FIG. 8, for convenience, only an element body and a coil are drawn, and these are illustrated by solid lines. The second embodiment is different from the first embodiment in a configuration of a pad portion of a coil. This different configuration will be described below. The other configurations are the same as those of the first embodiment, and are denoted by the same reference numerals as those of the first embodiment, and description thereof will be omitted.

As illustrated in FIG. 8, in an inductor component 1C of the second embodiment, a first pad portion 21C of a coil 15C has a first portion 21*a*, a second portion 21*b*, and a corner portion 21*c* between the first portion 21*a* and the second portion 21*b* when viewed from a direction orthogonal to the first main surface 10*a*. The corner portion 21*c* is an extension of the first portion 21*a* and is included in the first portion 21*a*.

The first portion 21*a* extends from the first end portion 20*a* in the connection direction L. The second portion 21*b* extends from a side of the first portion 21*a* in a direction that intersects the connection direction L and that is a direction in which the inner peripheral surface 20*c* of the coil wiring portion 20 is approached. Each of the first portion 21*a* and the second portion 21*b* is a portion extending with the same width. In FIG. 8, for convenience, a boundary between each of the first portion 21*a* and the second portion 21*b*, and the corner portion 21*c* is indicated by a two dot chain line. In this embodiment, the second portion 21*b* extends in a direction orthogonal to the connection direction L. That is, the first pad portion 21C is formed in an L-shape when viewed from the direction orthogonal to the first main surface 10*a*.

A first columnar wiring connected to the first pad portion 21C has a shape corresponding to the first pad portion 21C when viewed from the direction orthogonal to the first main surface 10*a*. Thus, an area of the first pad portion 21C can be increased, and connection reliability between the first pad portion 21C and the first columnar wiring can be improved.

When viewed from the direction orthogonal to the first main surface 10*a*, the first portion 21*a* of the first pad portion 21C protrudes inward in a radial direction of the coil 15C from the inner peripheral surface 20*c* of the coil wiring portion 20. The first plane 211 is a surface at a location closest to the inner peripheral surface 20*c* of the coil wiring portion 20 among surfaces extending in parallel to the connection direction L of the first pad portion 21C, and thus corresponds to a surface on a distal end side of the second portion 21*b*. The second plane 212 is a surface at a location closest to the inner peripheral surface 20*c* of the coil wiring portion 20 among surfaces extending in the direction orthogonal to the connection direction L of the first pad portion 21C, and thus corresponds to a surface on a base end side (side of the first end portion 20*a*) of the first portion 21*a*. In this case, the first distance a between the second virtual plane S212 and the second plane 212 can be easily made less than the second distance b between the first virtual surface S211 and the first plane 211. The first distance a may be the same as the second distance b, and for example, the first distance a is 100 μm, the second distance b is 100 μm, and the shortest distance c is 200 μm.

Similarly, a second pad portion 22C of the coil 15C has a first portion 22*a*, a second portion 22*b*, and a corner portion 22*c* between the first portion 22*a* and the second portion 22*b* when viewed from the direction orthogonal to the first main surface 10*a*.

The first portion 22*a* extends from the second end portion 20*b* in the connection direction L. The second portion 22*b* extends from a side of the first portion 22*a* in a direction that intersects the connection direction L and that is a direction in which the inner peripheral surface 20*c* of the coil wiring portion 20 is approached. In this embodiment, the second portion 21*b* extends in the direction orthogonal to the connection direction L. In other words, the second pad portion 22C is formed in an L-shape when viewed from the direction orthogonal to the first main surface 10*a*, and is formed symmetrically with the first pad portion 21C.

A second columnar wiring connected to the second pad portion 22C has a shape corresponding to the second pad portion 22C when viewed from the direction orthogonal to the first main surface 10*a*. Thus, an area of the second pad portion 22C can be increased, and connection reliability between the second pad portion 22C and the second columnar wiring can be improved.

When viewed from the direction orthogonal to the first main surface 10*a*, the first portion 22*a* of the second pad portion 22C protrudes inward in the radial direction of the coil 15C from the inner peripheral surface 20*c* of the coil wiring portion 20. The first plane 221 corresponds to a surface on a distal end side of the second portion 22*b*. The second plane 222 corresponds to a surface on a base end side (side of the second end portion 20*b*) of the first portion 22*a*.

Third Embodiment

Figure 9:
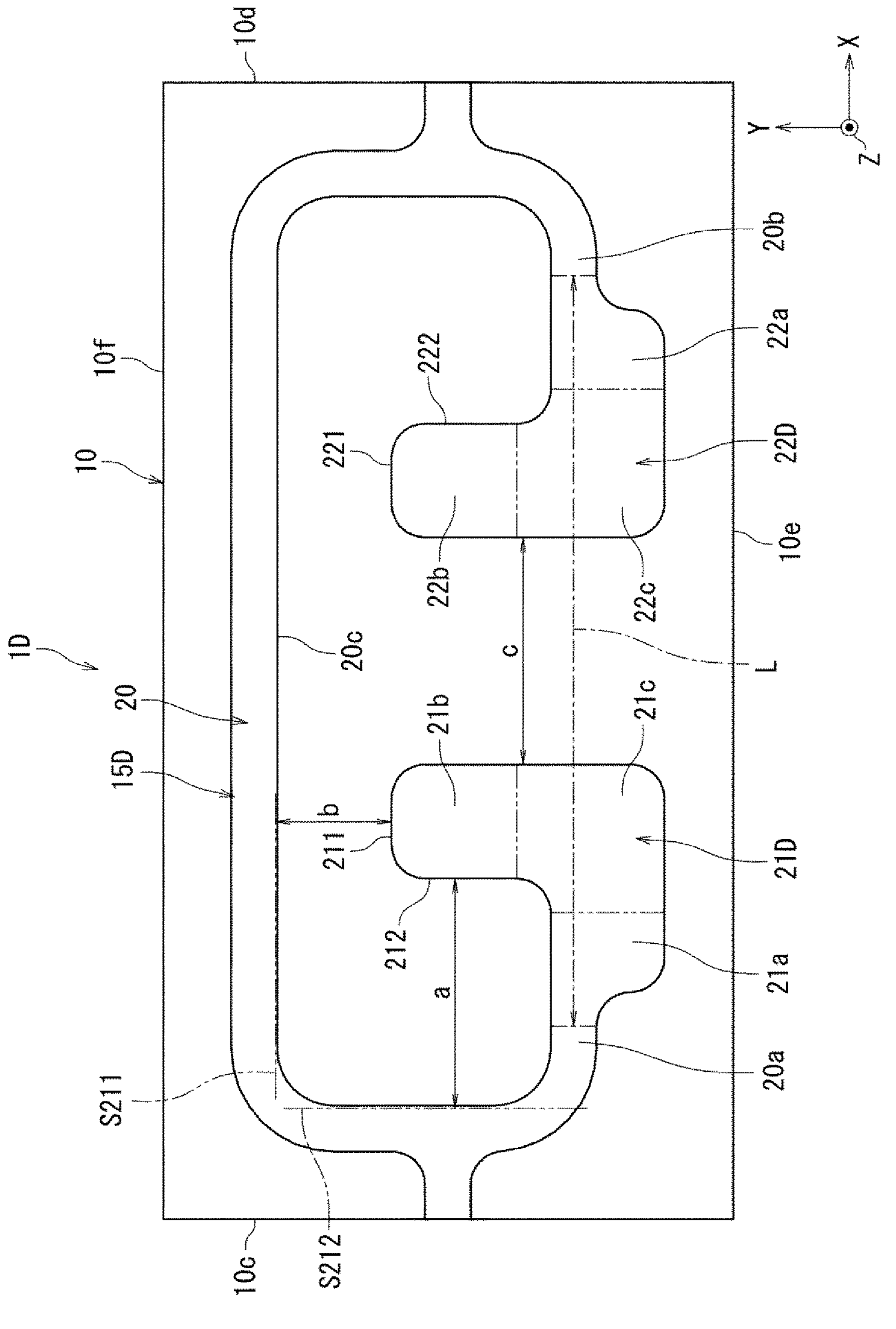
FIG. 9 is a plan view illustrating a third embodiment of the inductor component.

FIG. 9 is a plan view illustrating a third embodiment of the inductor component. In FIG. 9, for convenience, only an element body and a coil are drawn, and these are illustrated by solid lines. The third embodiment is different from the second embodiment in a configuration of a pad portion of a coil. This different configuration will be described below. The other configurations are the same as those of the second embodiment, and are denoted by the same reference numerals as those of the second embodiment, and description thereof will be omitted. Note that, although the configuration of the pad portion is different from that of the second embodiment, a first portion and a second portion of the pad portion are defined in the same manner as those of the second embodiment.

As illustrated in FIG. 9, in an inductor component 1D of the third embodiment, the first portion 21*a* of a first pad portion 21D of a coil 15D does not protrude inward in a radial direction of the coil 15D from the inner peripheral surface 20*c* of the coil wiring portion 20 when viewed from a direction orthogonal to the first main surface 10*a*. In other words, the first portion 21*a* protrudes outward in the radial direction from an outer peripheral surface of the coil wiring portion 20. At this time, the first plane 211 corresponds to a surface on a distal end side of the second portion 21*b*, and the second plane 212 corresponds to a side surface of the second portion 21*b*.

According to the above-described configuration, it is possible to increase a distance between the inner peripheral surface 20*c* of the coil wiring portion 20 and the first pad portion 21D in the connection direction L, and to further reduce a possibility of a short circuit between the coil wiring portion 20 and the first pad portion 21D in the connection direction L. For example, the first distance a between the second virtual plane S212 and the second plane 212 can be easily made greater than the second distance b between the first virtual surface S211 and the first plane 211. For example, the first distance a is 200 μm, the second distance b is 100 μm, and the shortest distance c is 200 μm.

Similarly, the first portion 22*a* of a second pad portion 22D of the coil 15D does not protrude inward in the radial direction of the coil 15D from the inner peripheral surface 20*c* of the coil wiring portion 20 when viewed from the direction orthogonal to the first main surface 10*a*. In other words, the first portion 22*a* protrudes outward in the radial direction from the outer peripheral surface of the coil wiring portion 20. At this time, the first plane 221 corresponds to a surface on a distal end side of the second portion 22*b*, and the second plane 222 corresponds to a side surface of the second portion 22*b*.

According to the above-described configuration, it is possible to increase a distance between the inner peripheral surface 20*c* of the coil wiring portion 20 and the second pad portion 22D in the connection direction L, and to further reduce a possibility of a short circuit between the coil wiring portion 20 and the second pad portion 22D in the connection direction L.

Fourth Embodiment

Figure 10:
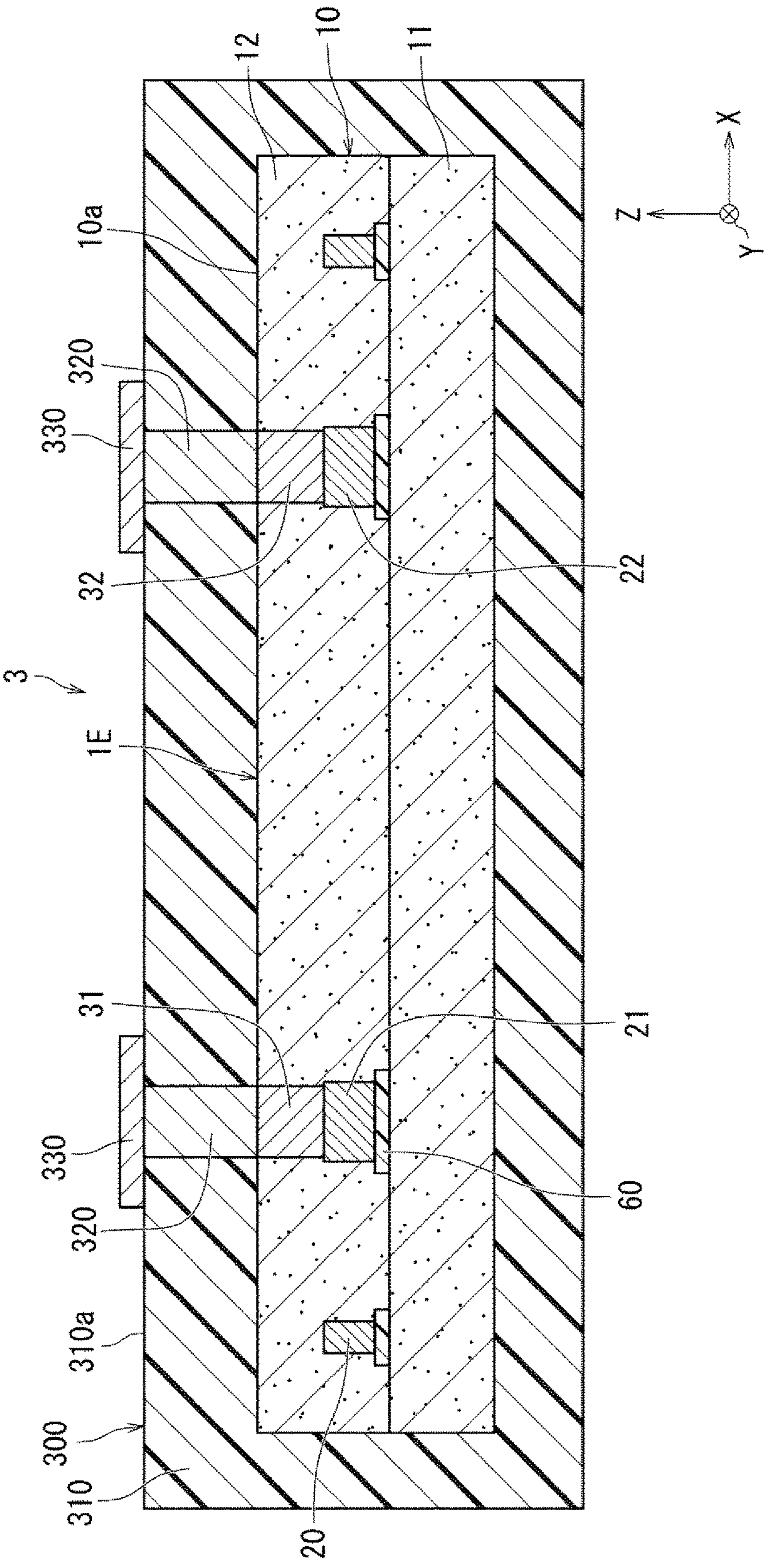
FIG. 10 is a sectional view illustrating an embodiment of a mounting component.

FIG. 10 is a sectional view illustrating an embodiment of a mounting component. As illustrated in FIG. 10, a mounting component 3 includes a substrate 300 and an inductor component 1E disposed in the substrate 300.

The inductor component 1E has the configuration of the inductor component 1 illustrated in the first embodiment and does not include the first external terminal 41, the second external terminal 42, and the coating film 50.

The substrate 300 has a main body portion 310, an internal wiring 320, and an external wiring 330. The main body portion 310 is made of, for example, an insulating material. The internal wiring 320 is provided in the main body portion 310. The external wiring 330 is provided on a main surface 310*a* of the main body portion 310. The internal wiring 320 is connected to the first columnar wiring 31 and the second columnar wiring 32 in the inductor component 1E. The internal wiring 320 is connected to the external wiring 330. Thus, the inductor component 1E is electrically connected to the external wiring 330.

According to the above-described configuration, since the inductor component 1E is built into the substrate 300, it is possible to increase a mounting area of a surface of the substrate 300.

Note that, the present disclosure is not limited to the above-described embodiments, and design changes can be made without departing from the scope of the present disclosure. For example, the features of the first to fourth embodiments may be combined in various ways.

In the above-described embodiments, at least a part of the first pad portion extends in the direction orthogonal to the connection direction L, but may extend in a direction intersecting the connection direction L at an angle other than a right angle. Similarly, at least a part of the second pad portion extends in the direction orthogonal to the connection direction L, but may extend in a direction intersecting the connection direction L at an angle other than a right angle.

In the above-described embodiments, the shape of each of the first pad portion and the second pad portion is formed in the linear shape or the L-shape, but may be any shape as long as the shape has a part extending in a direction, that intersects the connection direction L and that is a direction in which the inner peripheral surface of the coil wiring portion is approached.

What is claimed is:

1. An inductor component, comprising:

an element body having a main surface;

a coil disposed in the element body, and extending along the main surface; and a first vertical wiring and a second vertical wiring in the element body such that respective end surfaces thereof are exposed from the main surface of the element body, and connected to respective ends of the coil, the coil including a coil wiring portion having a first end portion and a second end portion, and extending along a circumferential direction, with a number of turns equal to or less than 1, a first pad portion to which the first vertical wiring is connected and which is connected to the first end portion, and a second pad portion to which the second vertical wiring is connected and which is connected to the second end portion, wherein when viewed from a direction orthogonal to the main surface, at least a portion of the first pad portion extends in a direction that intersects a direction in which the first end portion and the second end portion of the coil wiring portion are connected and extends in a direction close towards an inner peripheral surface of the coil wiring portion, and when viewed from the direction orthogonal to the main surface, at least a portion of the second pad portion extends in the direction that intersects the direction in which the first end portion and the second end portion of the coil wiring portion are connected and extends in the direction close towards the inner peripheral surface of the coil wiring portion.

2. The inductor component according to claim 1, further comprising:

a first external terminal in contact with the main surface of the element body and the end surface of the first vertical wiring; and a second external terminal in contact with the main surface of the element body and the end surface of the second vertical wiring.

3. The inductor component according to claim 2, wherein the element body includes a magnetic powder, and the first external terminal and the second external terminal are in contact with the magnetic powder.

4. The inductor component according to claim 1, further comprising:

a coating film on the main surface of the element body, wherein the coating film contains a black colorant.

5. The inductor component according to claim 1, wherein when viewed from the direction orthogonal to the main surface of the element body, the first pad portion has a linear first plane that is a distal end surface in an extending direction of the first pad portion and that faces the inner peripheral surface of the coil wiring portion, and a shortest distance between the first plane and the inner peripheral surface of the coil wiring portion is not a minimum among distances between an outer surface of the first pad portion and the inner peripheral surface of the coil wiring portion.

6. The inductor component according to claim 1, wherein when viewed from the direction orthogonal to the main surface, the first pad portion has a linear first plane extending in the direction in which the first end portion and the second end portion of the coil wiring portion are connected, and facing the inner peripheral surface of the coil wiring portion, and a linear second plane extending in a direction orthogonal to the direction in which the first end portion and the second end portion of the coil wiring portion are connected, and facing the inner peripheral surface of the coil wiring portion, and when a first virtual surface is defined as a surface parallel to the first plane of the first pad portion and tangent to a part, of the inner peripheral surface of the coil wiring portion, facing the first plane, and a second virtual surface is defined as a surface parallel to the second plane of the first pad portion and tangent to a part, of the inner peripheral surface of the coil wiring portion, facing the second plane, and a first distance between the second virtual surface and the second plane is less than a second distance between the first virtual surface and the first plane.

7. The inductor component according to claim 1, wherein when viewed from the direction orthogonal to the main surface, the first pad portion has a linear first plane extending in the direction in which the first end portion and the second end portion of the coil wiring portion are connected, and facing the inner peripheral surface of the coil wiring portion, and a linear second plane extending in a direction orthogonal to the direction in which the first end portion and the second end portion of the coil wiring portion are connected, and facing the inner peripheral surface of the coil wiring portion, and when a first virtual surface is defined as a surface parallel to the first plane of the first pad portion and tangent to a part, of the inner peripheral surface of the coil wiring portion, facing the first plane, and a second virtual surface is defined as a surface parallel to the second plane of the first pad portion and tangent to a part, of the inner peripheral surface of the coil wiring portion, facing the second plane, a first distance between the second virtual surface and the second plane is equal to or greater than a second distance between the first virtual surface and the first plane.

8. The inductor component according to claim 6, wherein the element body includes a magnetic powder, and the first distance between the second virtual surface and the second plane is equal to or greater than twice a particle size D50 of the magnetic powder.

9. The inductor component according to claim 6, wherein when viewed from the direction orthogonal to the main surface, a shortest distance between the first pad portion and the second pad portion is greater than the first distance between the second virtual surface and the second plane.

10. The inductor component according to claim 6, wherein when viewed from the direction orthogonal to the main surface, a shortest distance between the first pad portion and the second pad portion is equal to or less than the first distance between the second virtual surface and the second plane.

11. The inductor component according to claim 9, wherein the element body includes a magnetic powder, and the shortest distance between the first pad portion and the second pad portion is equal to or greater than twice a particle size D50 of the magnetic powder.

12. The inductor component according to claim 1, wherein when viewed from the direction orthogonal to the main surface, the first pad portion has a first portion extending from the first end portion of the coil wiring portion in the direction in which the first end portion and the second end portion of the coil wiring portion are connected, and a second portion extending from the first portion side in the direction that intersects the direction in which the first end portion and the second end portion of the coil wiring portion are connected and extending in the direction close towards the inner peripheral surface of the coil wiring portion, and when viewed from the direction orthogonal to the main surface, the second pad portion has a first portion extending from the second end portion of the coil wiring portion in the direction in which the first end portion and the second end portion of the coil wiring portion are connected, and a second portion extending from the first portion side in the direction that intersects the direction in which the first end portion and the second end portion of the coil wiring portion are connected and extending in the direction close towards the inner peripheral surface of the coil wiring portion.

13. The inductor component according to claim 12, wherein when viewed from the direction orthogonal to the main surface, the first portion of the first pad portion does not protrude inward from the inner peripheral surface of the coil wiring portion.

14. The inductor component according to claim 1, wherein a thickness of the coil is less than a thickness of each of the first vertical wiring and the second vertical wiring.

15. The inductor component according to claim 1, wherein the element body has a first magnetic layer and a second magnetic layer stacked in order in a first direction orthogonal to the main surface, the first vertical wiring and the second vertical wiring extend in the first direction from the respective ends of the coil, the first magnetic layer is present in a direction opposite to the first direction of the coil, the second magnetic layer is present in the first direction of the coil and in a direction orthogonal to the first direction, the first vertical wiring and the second vertical wiring penetrate the second magnetic layer, and a thickness of the first magnetic layer is greater than a thickness of the second magnetic layer.

16. A mounting component, comprising:

a substrate; and the inductor component according to claim 1 disposed in the substrate.

17. The inductor component according to claim 2, further comprising:

a coating film on the main surface of the element body, wherein the coating film contains a black colorant.

18. The inductor component according to claim 2, wherein when viewed from the direction orthogonal to the main surface of the element body, the first pad portion has a linear first plane that is a distal end surface in an extending direction of the first pad portion and that faces the inner peripheral surface of the coil wiring portion, and a shortest distance between the first plane and the inner peripheral surface of the coil wiring portion is not a minimum among distances between an outer surface of the first pad portion and the inner peripheral surface of the coil wiring portion.

19. The inductor component according to claim 2, wherein when viewed from the direction orthogonal to the main surface, the first pad portion has a linear first plane extending in the direction in which the first end portion and the second end portion of the coil wiring portion are connected, and facing the inner peripheral surface of the coil wiring portion, and a linear second plane extending in a direction orthogonal to the direction in which the first end portion and the second end portion of the coil wiring portion are connected, and facing the inner peripheral surface of the coil wiring portion, and when a first virtual surface is defined as a surface parallel to the first plane of the first pad portion and tangent to a part, of the inner peripheral surface of the coil wiring portion, facing the first plane, and a second virtual surface is defined as a surface parallel to the second plane of the first pad portion and tangent to a part, of the inner peripheral surface of the coil wiring portion, facing the second plane, and a first distance between the second virtual surface and the second plane is less than a second distance between the first virtual surface and the first plane.

20. The inductor component according to claim 2, wherein when viewed from the direction orthogonal to the main surface, the first pad portion has a linear first plane extending in the direction in which the first end portion and the second end portion of the coil wiring portion are connected, and facing the inner peripheral surface of the coil wiring portion, and a linear second plane extending in a direction orthogonal to the direction in which the first end portion and the second end portion of the coil wiring portion are connected, and facing the inner peripheral surface of the coil wiring portion, and when a first virtual surface is defined as a surface parallel to the first plane of the first pad portion and tangent to a part, of the inner peripheral surface of the coil wiring portion, facing the first plane, and a second virtual surface is defined as a surface parallel to the second plane of the first pad portion and tangent to a part, of the inner peripheral surface of the coil wiring portion, facing the second plane, a first distance between the second virtual surface and the second plane is equal to or greater than a second distance between the first virtual surface and the first plane.

* * * * *